United States Patent
Kawamura

[11] Patent Number: 5,760,970
[45] Date of Patent: Jun. 2, 1998

[54] ZOOM LENS OF HIGH MAGNIFICATION

[75] Inventor: Atsushi Kawamura, Yokosuka, Japan

[73] Assignee: Ricoh Company, Ltd., Tokyo, Japan

[21] Appl. No.: 625,107

[22] Filed: Apr. 1, 1996

[30]  Foreign Application Priority Data

Apr. 13, 1995  [JP]  Japan ................................ 7-088351

[51] Int. Cl.$^6$ .............................. G02B 15/14; G02B 13/18
[52] U.S. Cl. ............................................. 359/689; 359/713
[58] Field of Search ................................ 359/689, 686, 359/683, 713

[56]  References Cited

U.S. PATENT DOCUMENTS

| | | |
|---|---|---|
| 4,576,444 | 3/1986 | Kawamura . |
| 4,653,873 | 3/1987 | Kawamura . |
| 4,673,259 | 6/1987 | Kawamura . |
| 5,148,321 | 9/1992 | Goto et al. ............... 359/689 |
| 5,216,547 | 6/1993 | Ogata ........................ 359/689 |
| 5,343,329 | 8/1994 | Ito ............................. 359/689 |
| 5,361,167 | 11/1994 | Aoki .......................... 359/689 |

FOREIGN PATENT DOCUMENTS 6-67093  3/1994  Japan .

*Primary Examiner*—Scott J. Sugarman
*Attorney, Agent, or Firm*—Oblon, Spivak, McClelland, Maier & Neustadt, P.C.

[57]  ABSTRACT

A zoom lens of high magnification has first, second and third zoom groups which are sequentially arranged from an object side toward an image side and respectively have a positive focal length, a positive focal length and a negative focal length. The entire first to third zoom groups are moved onto the object side by zooming from a wide angle end for arranging the first and second zoom groups in proximity to each other to a telescopic end for arranging the second and third zoom groups in proximity to each other while a distance between the second and third zoom groups is reduced. The zoom lens is constructed by six lens groups composed of six lenses in which each of the zoom groups is constructed by one positive lens and one negative lens. A focal length $f_1$ of the first zoom group, a combined focal length $f_T$ of the entire lens system at the telescopic end, a focal length $f_2$ of the second zoom group and a combined focal length $f_W$ of the entire lens system at the wide angle end satisfy the following conditions. (1) $0.9 < f_1/f_T < 1.5$, (2) $0.6 < f_2/f_W < 0.85$ One lens face or more of the second zoom group and one lens face of more of the third zoom group are constructed by aspherical surfaces.

7 Claims, 28 Drawing Sheets

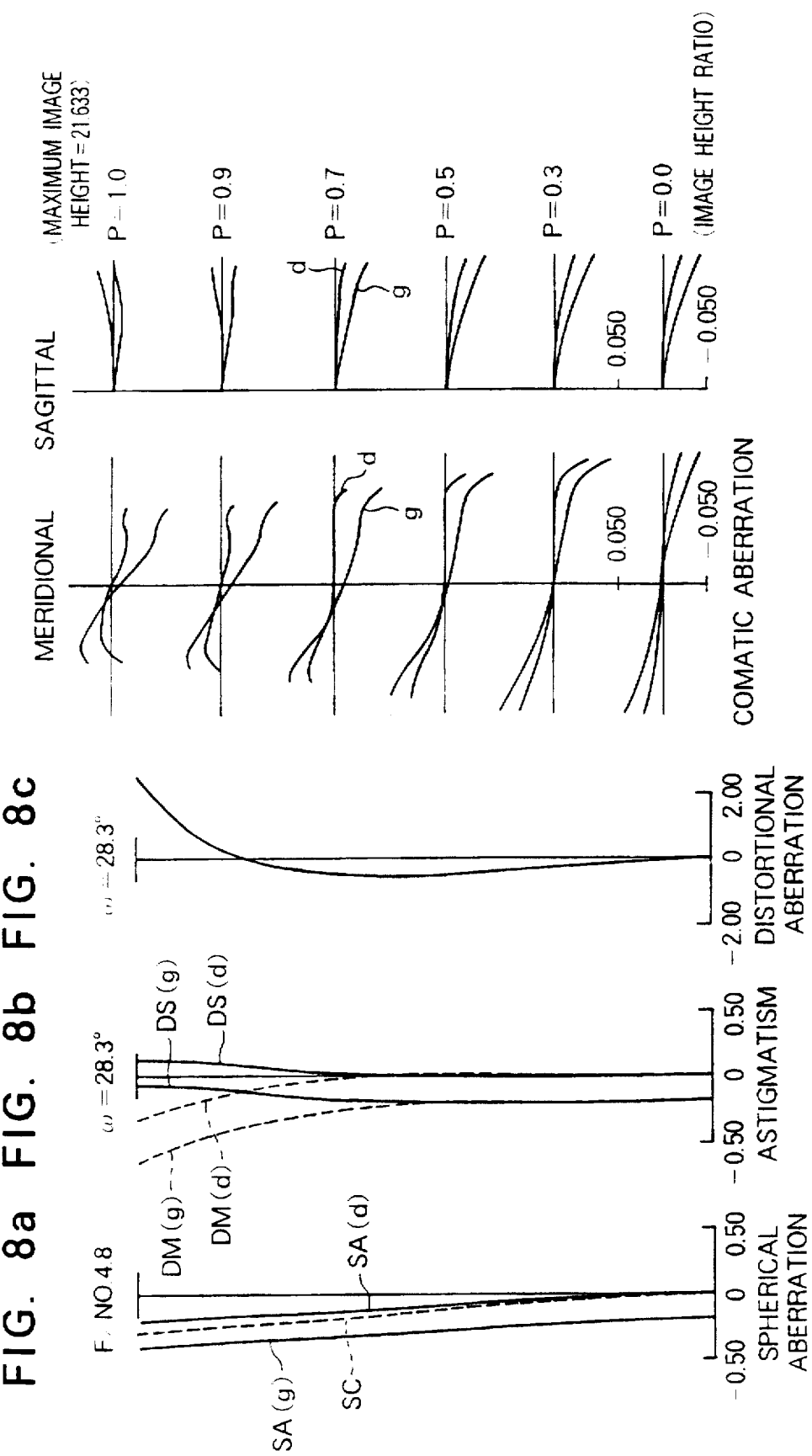

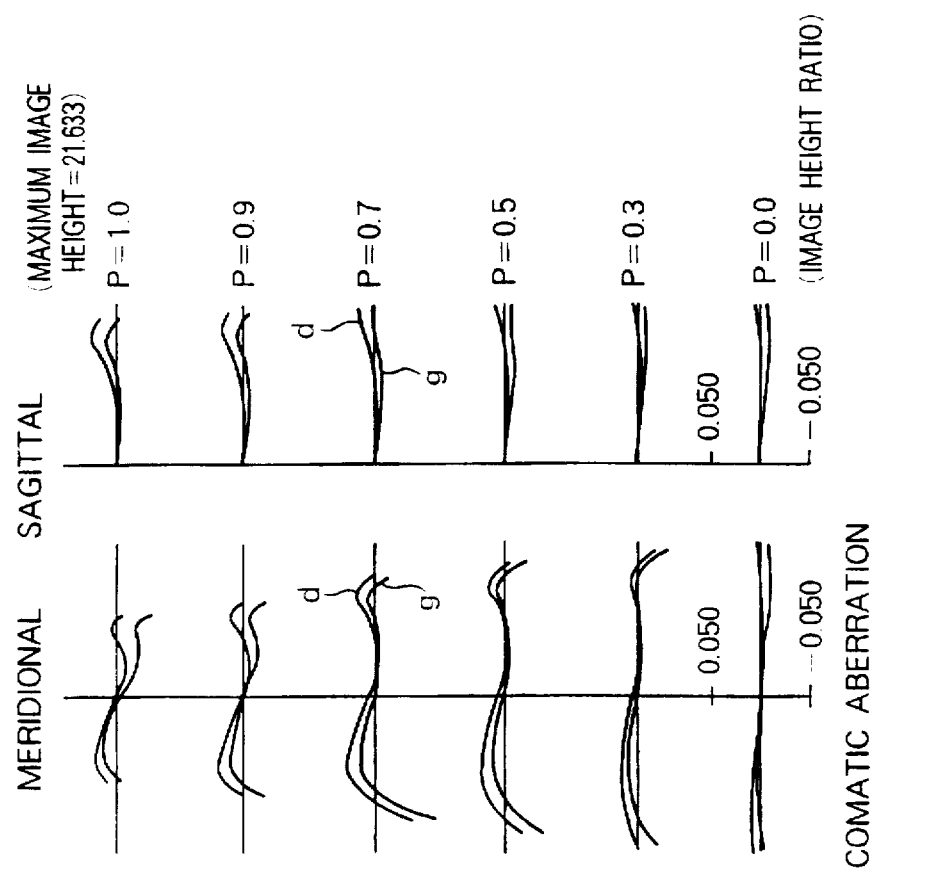

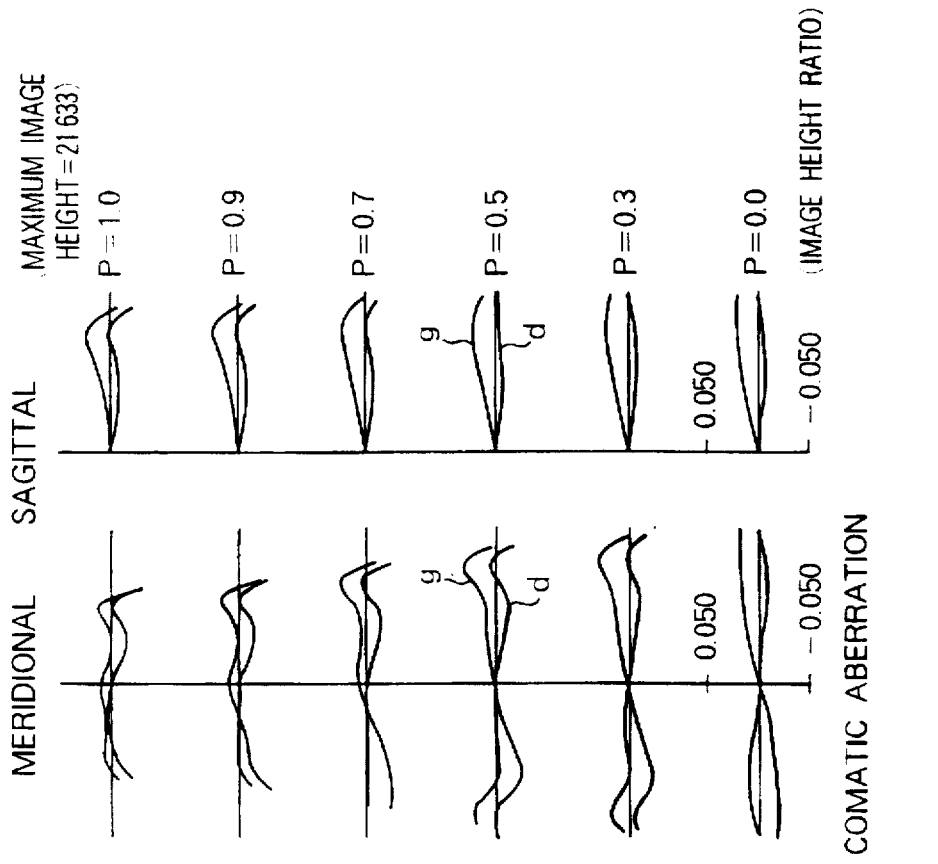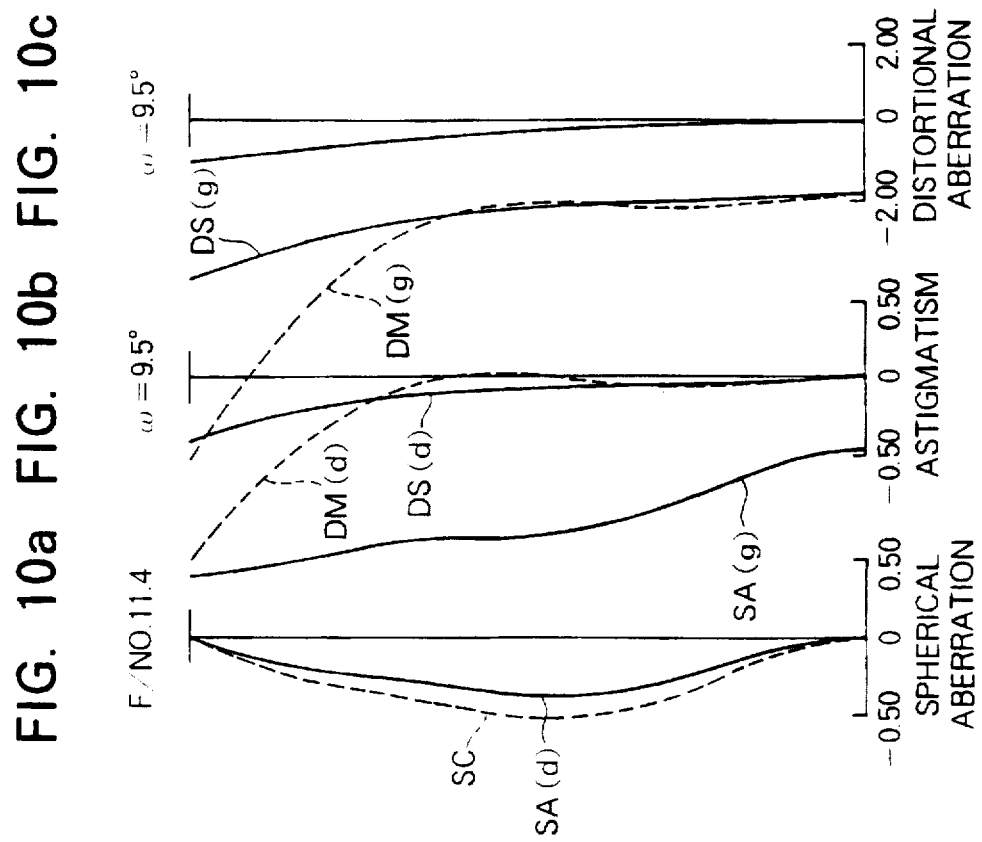

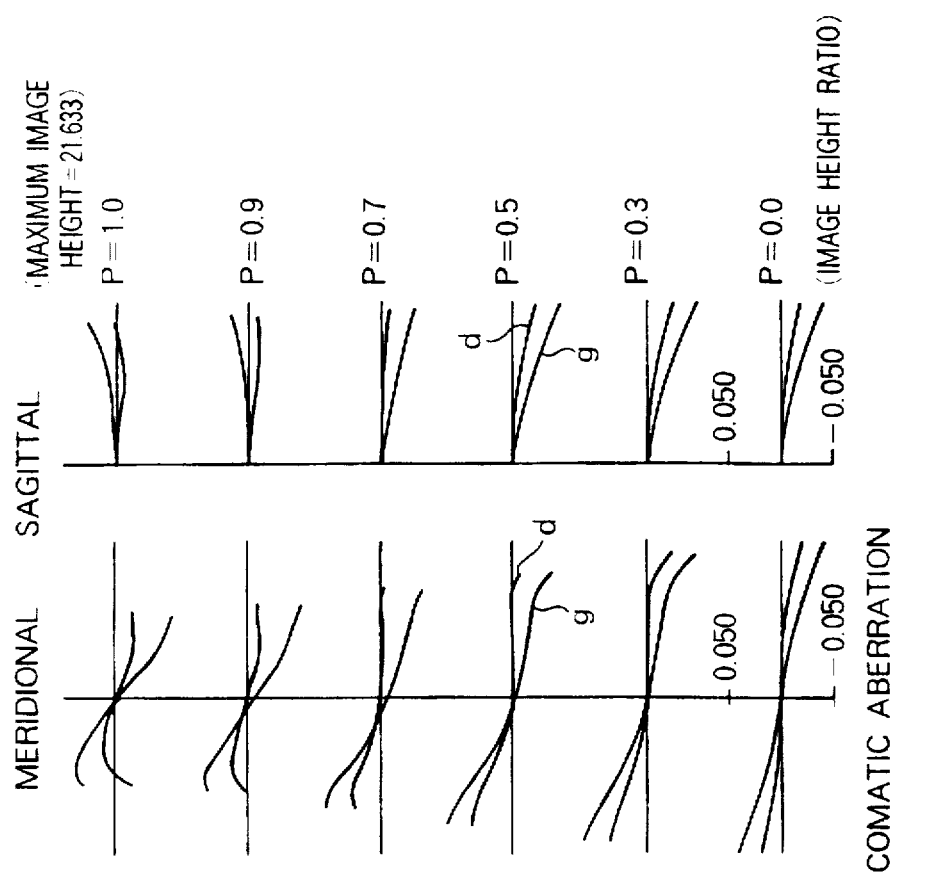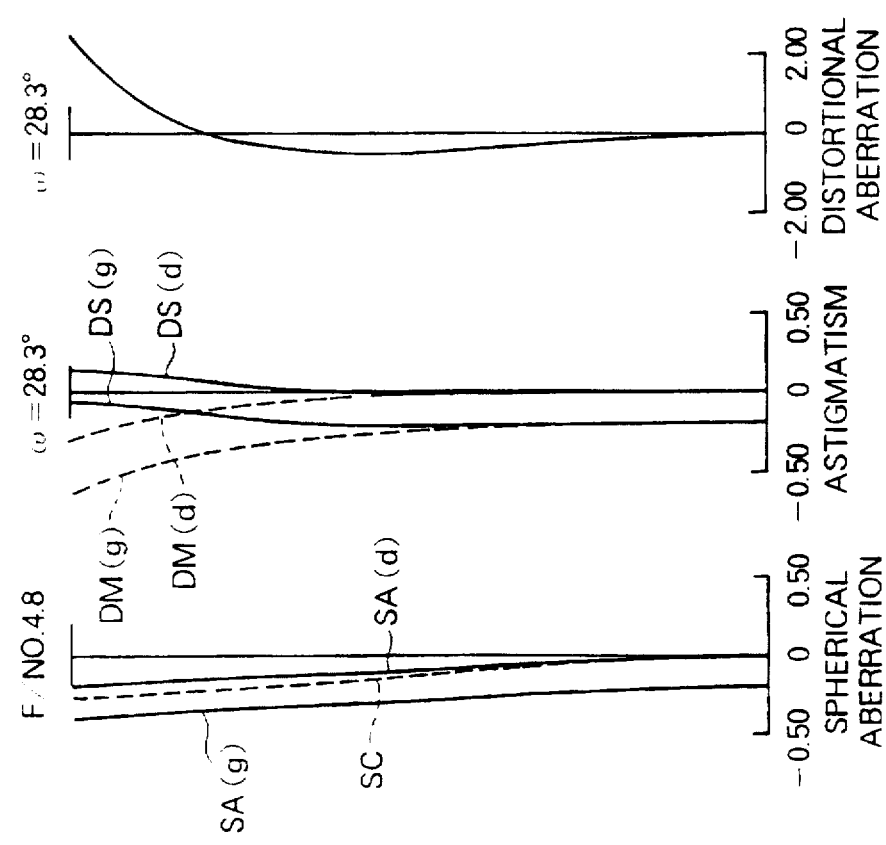
FIG. 11a  FIG. 11b  FIG. 11c  FIG. 11d  FIG. 11e

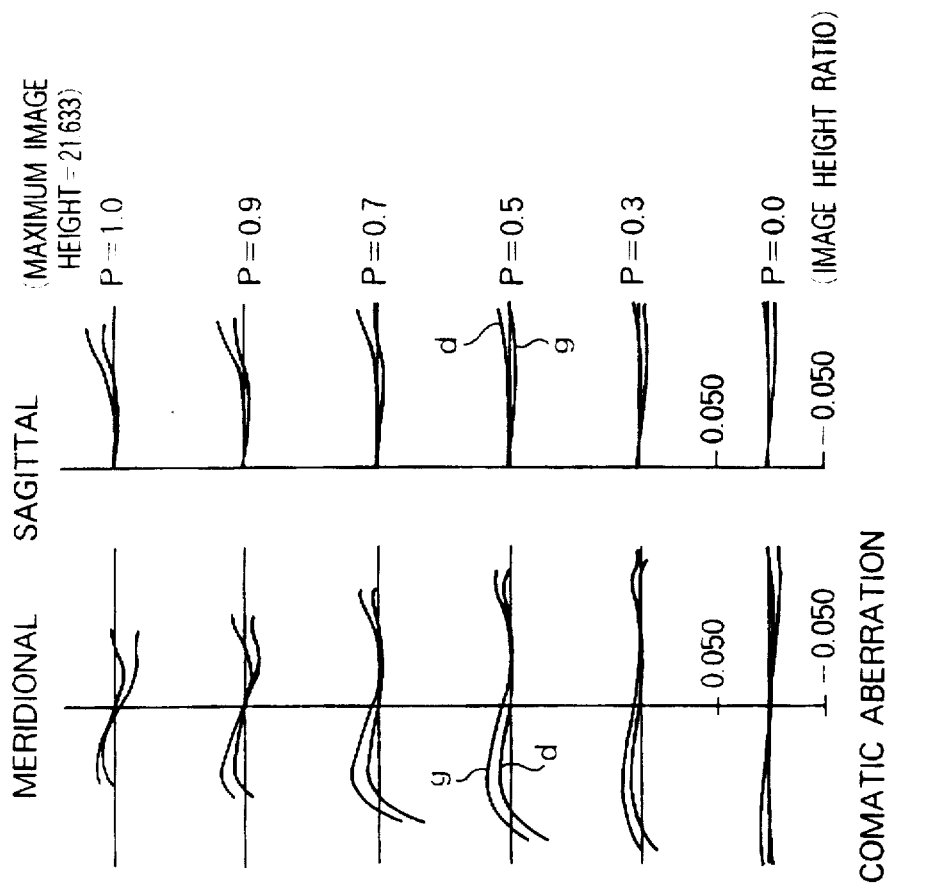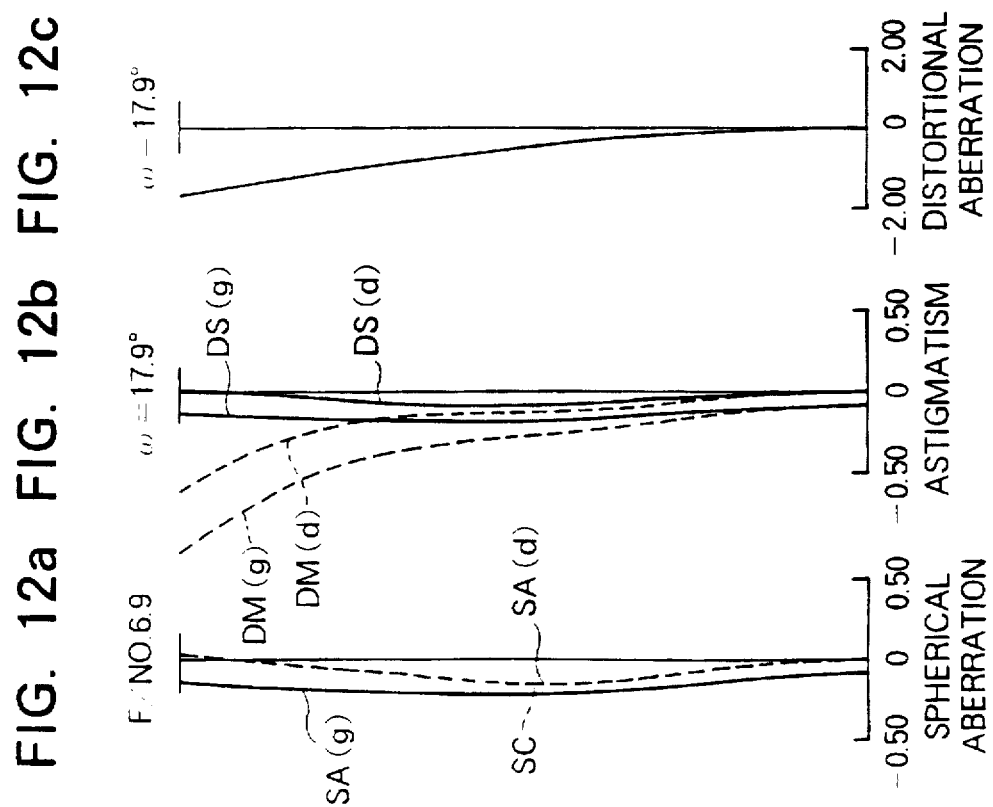

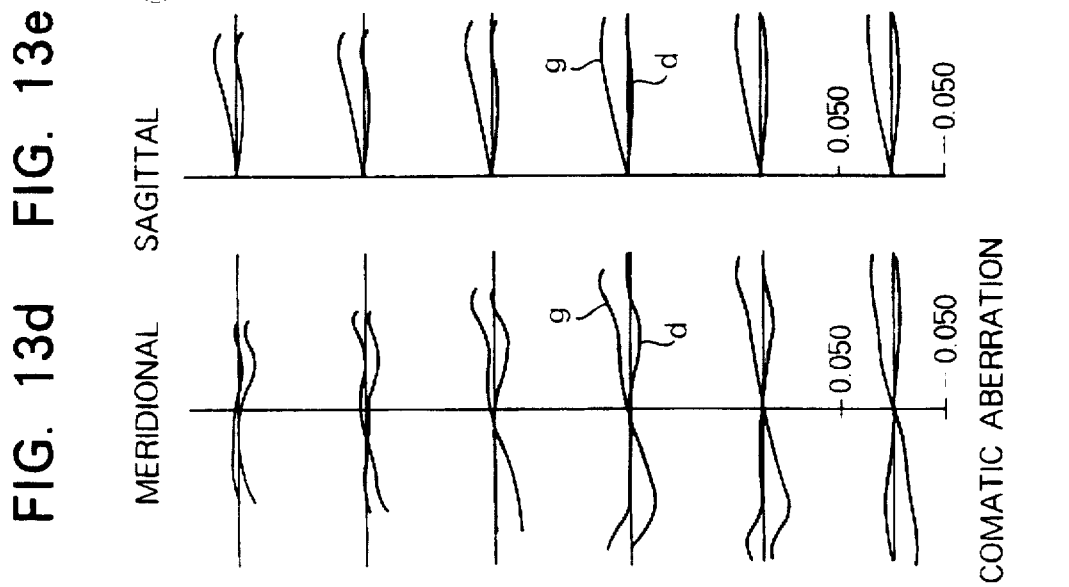
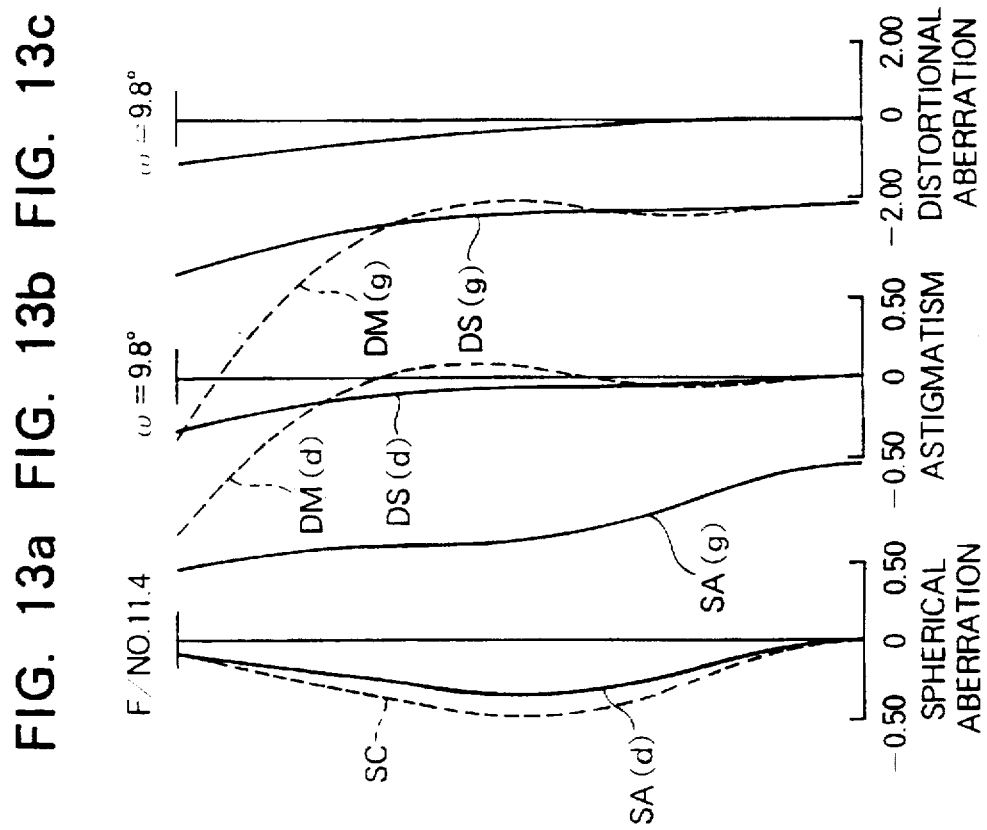

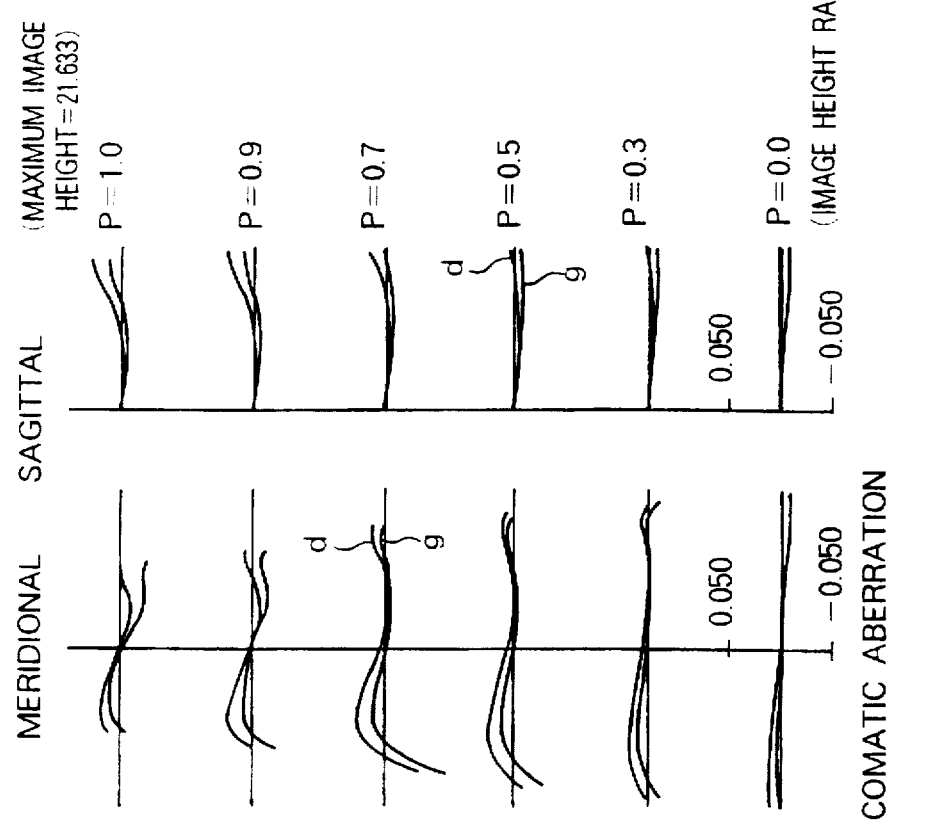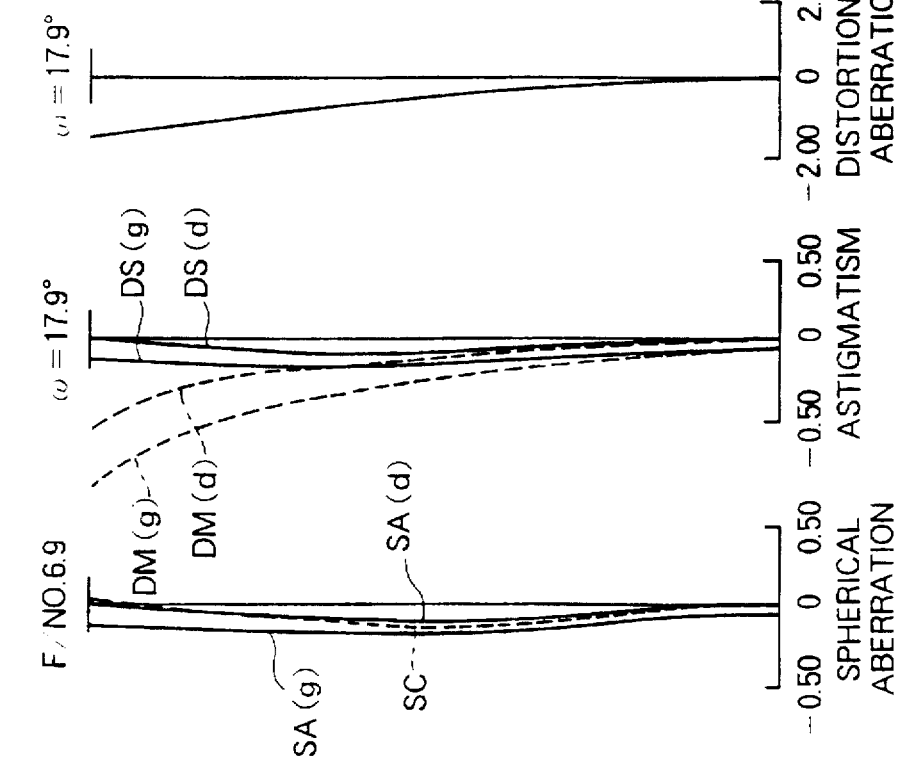

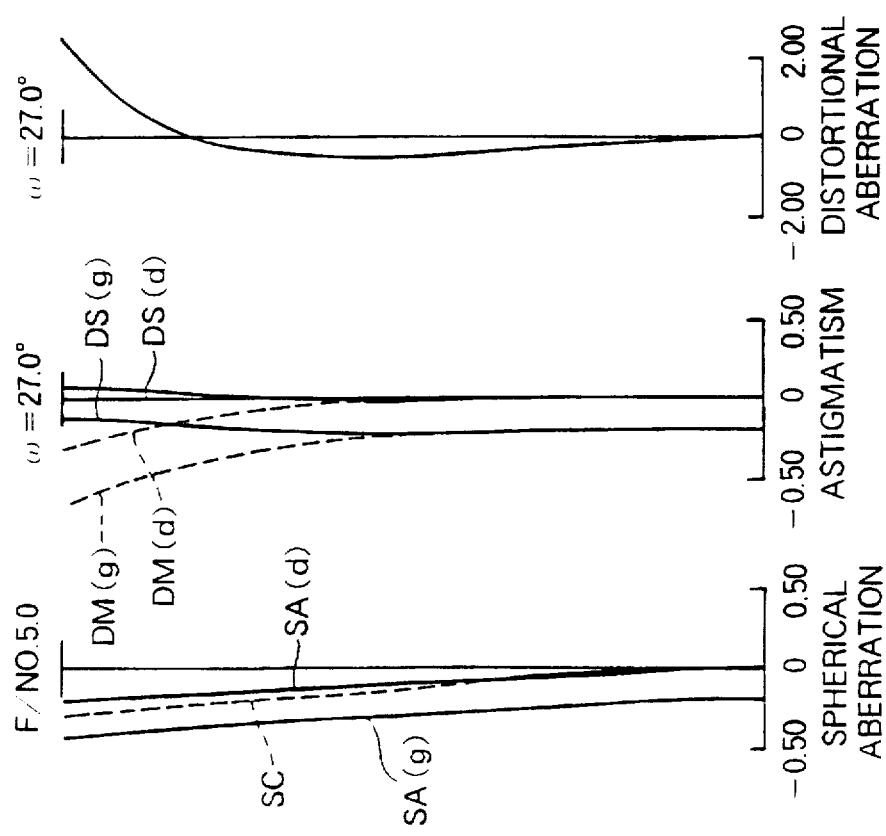

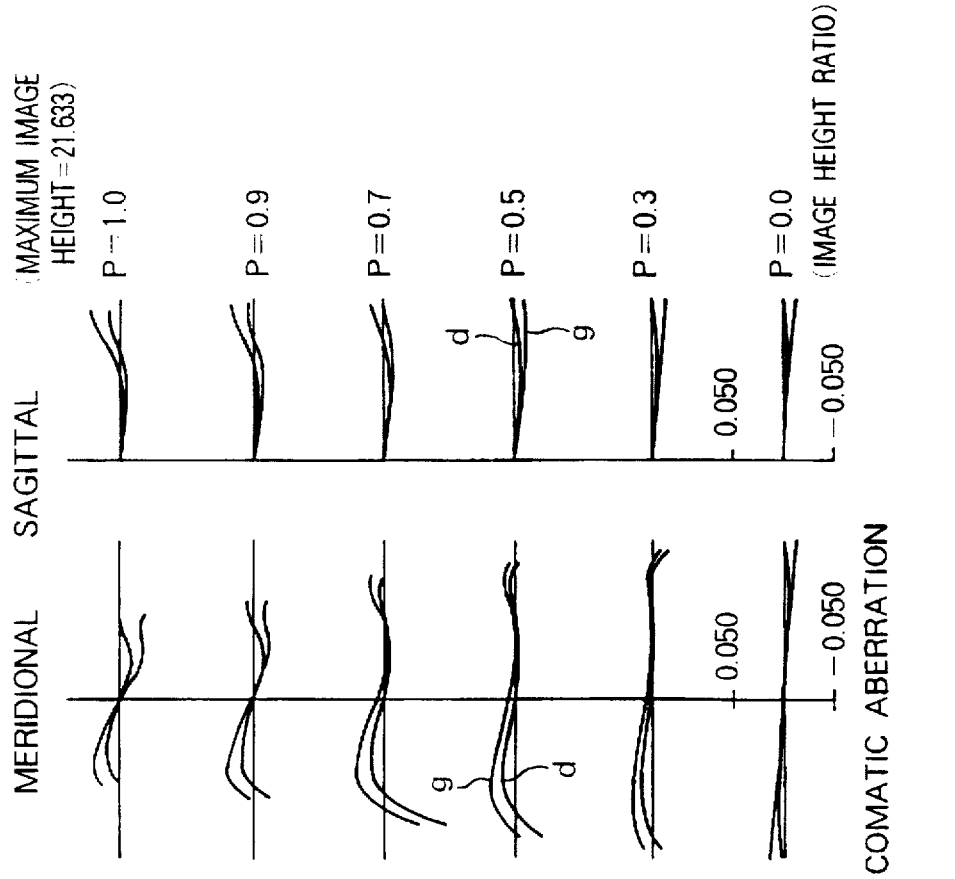
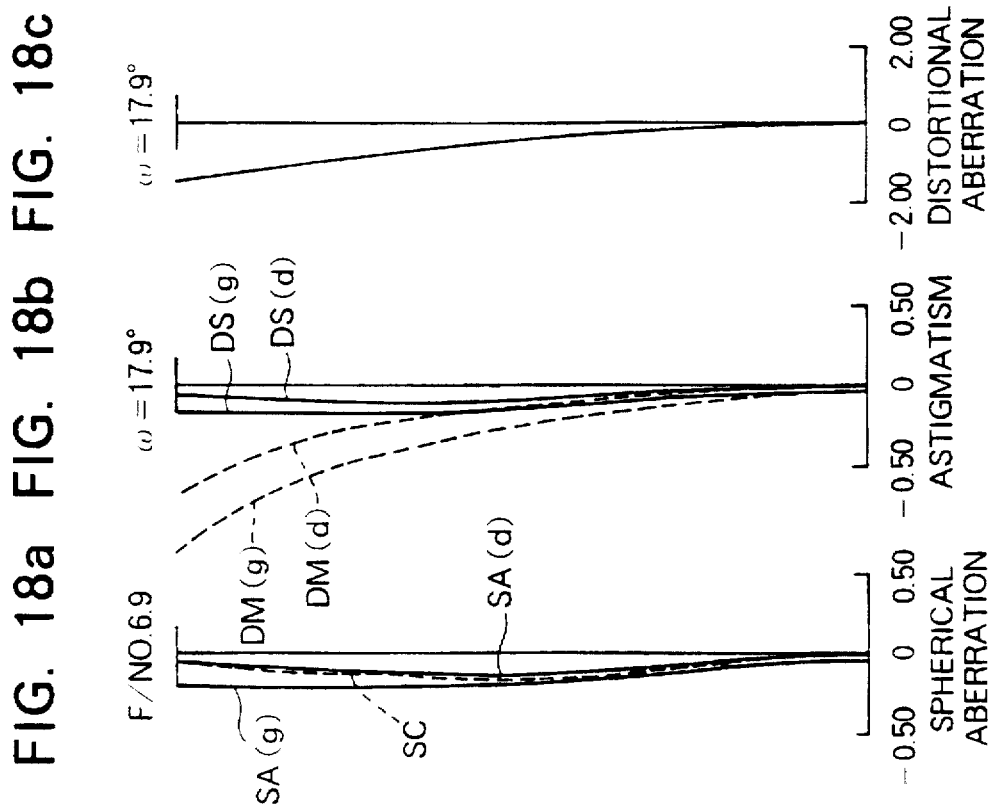
FIG. 18a  FIG. 18b  FIG. 18c  FIG. 18d  FIG. 18e

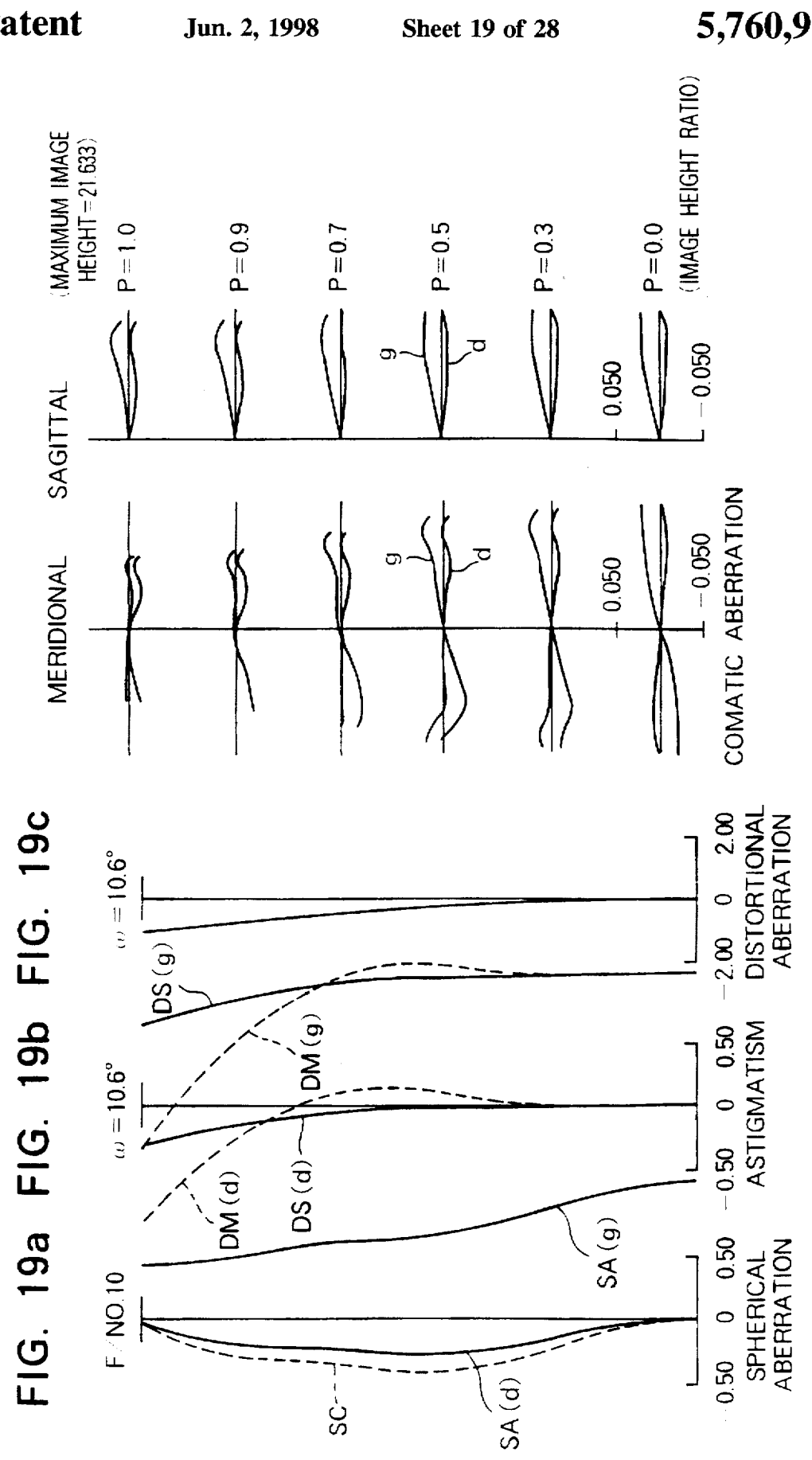

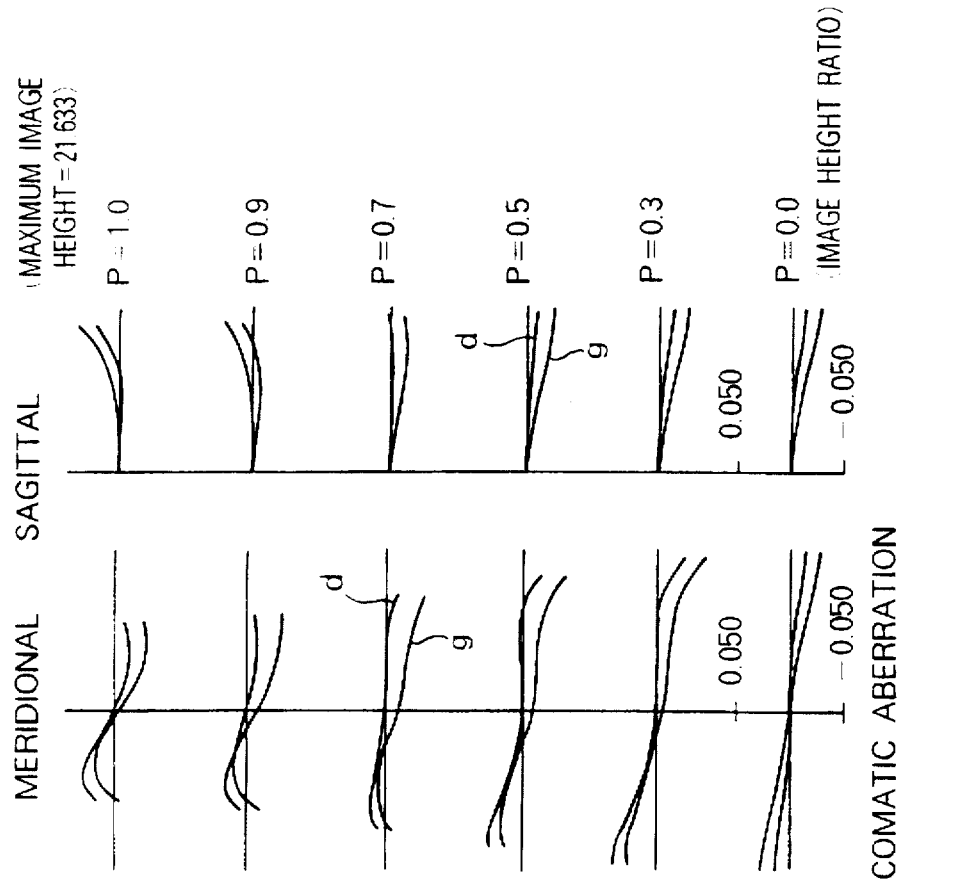
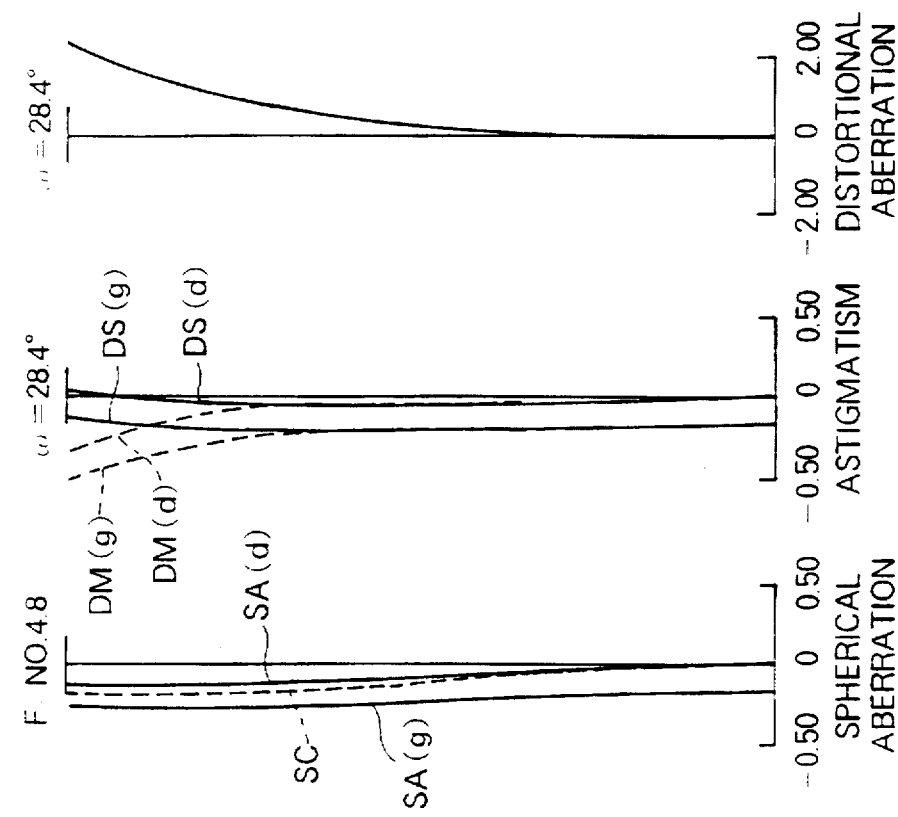

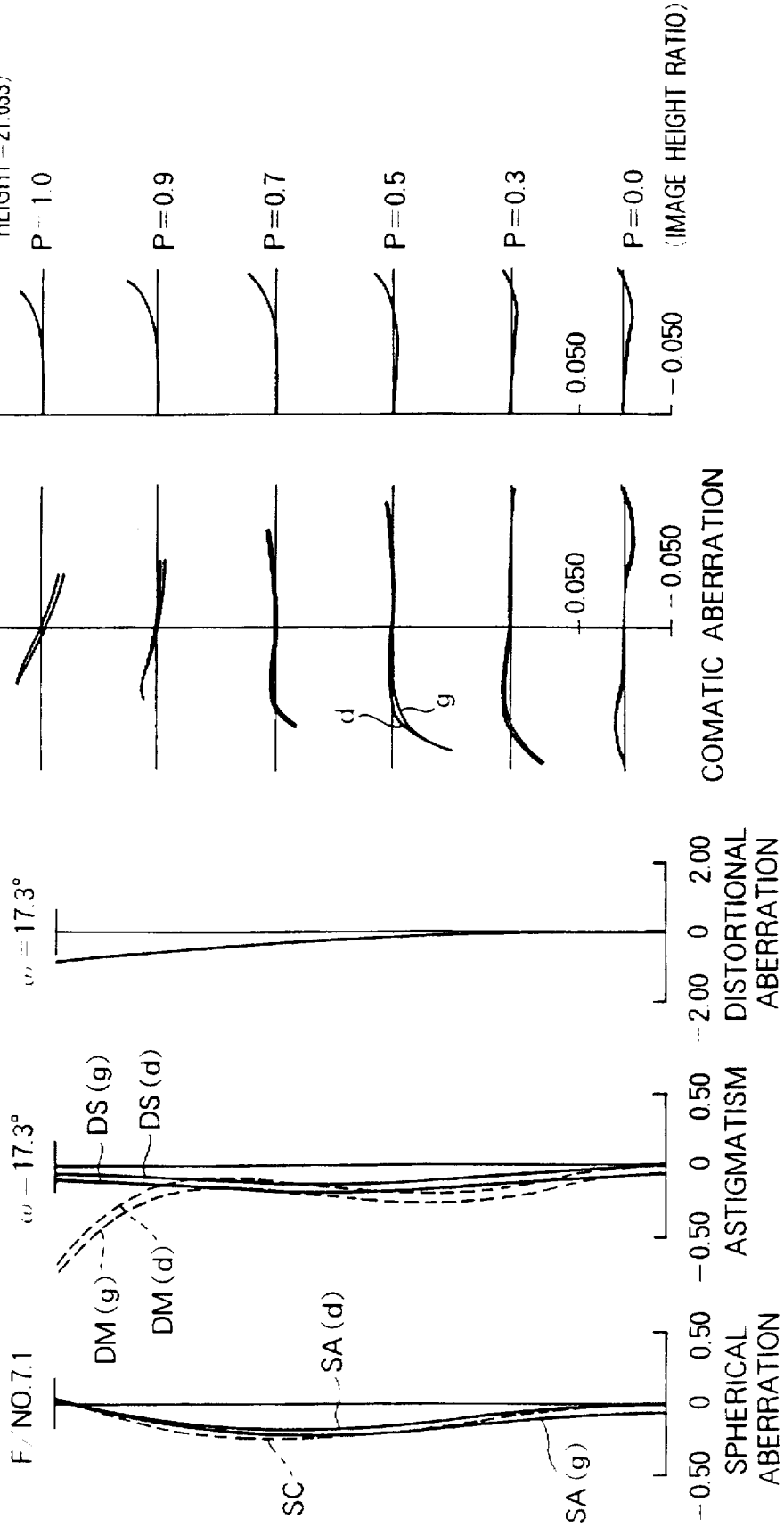

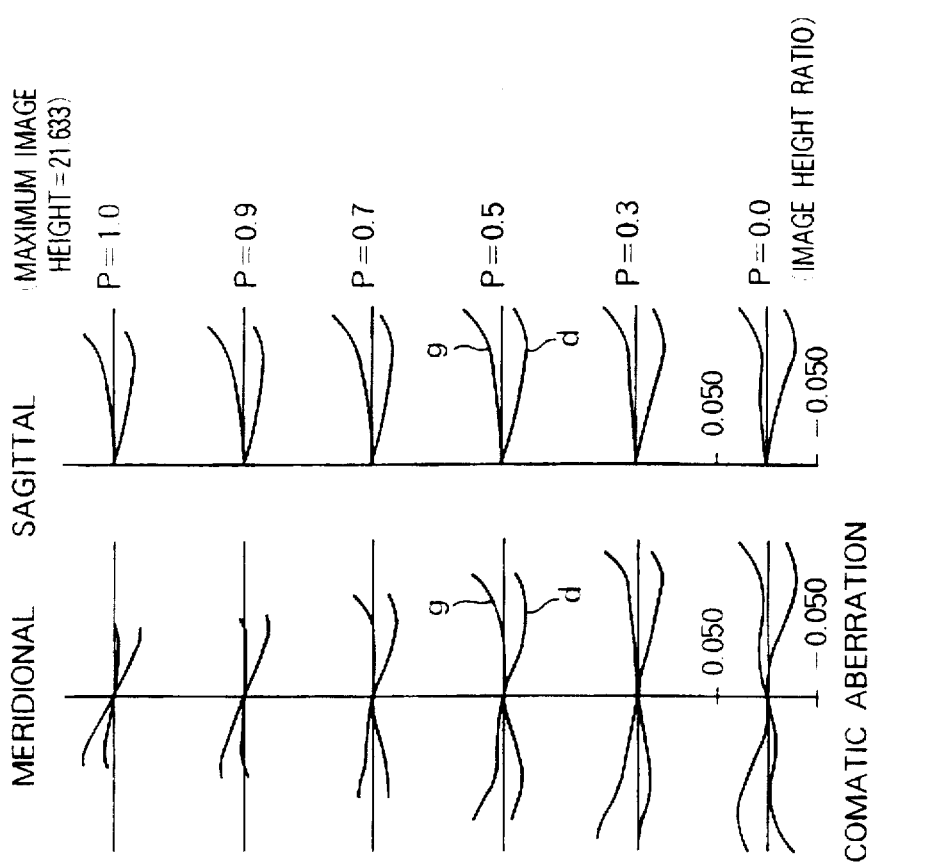
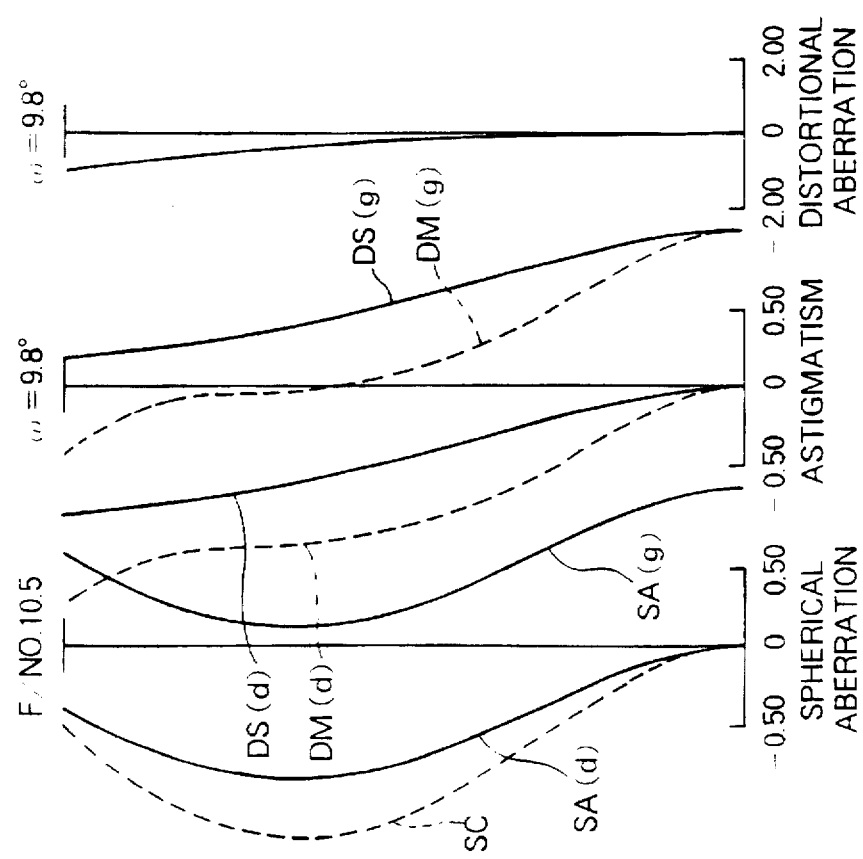

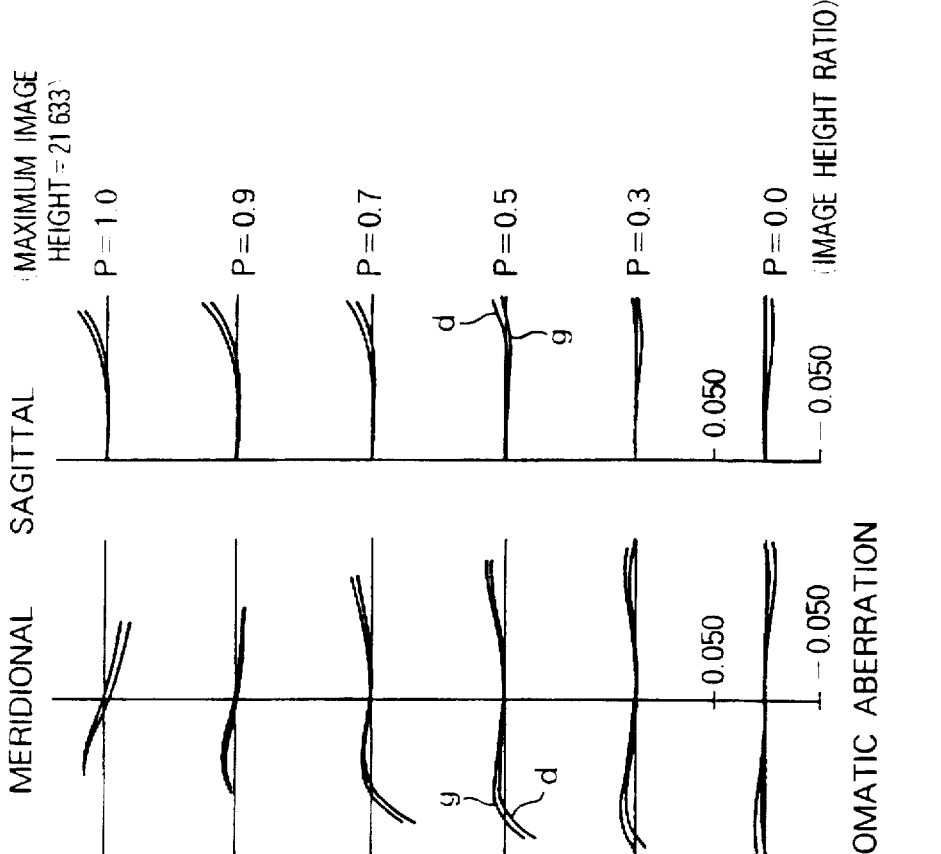
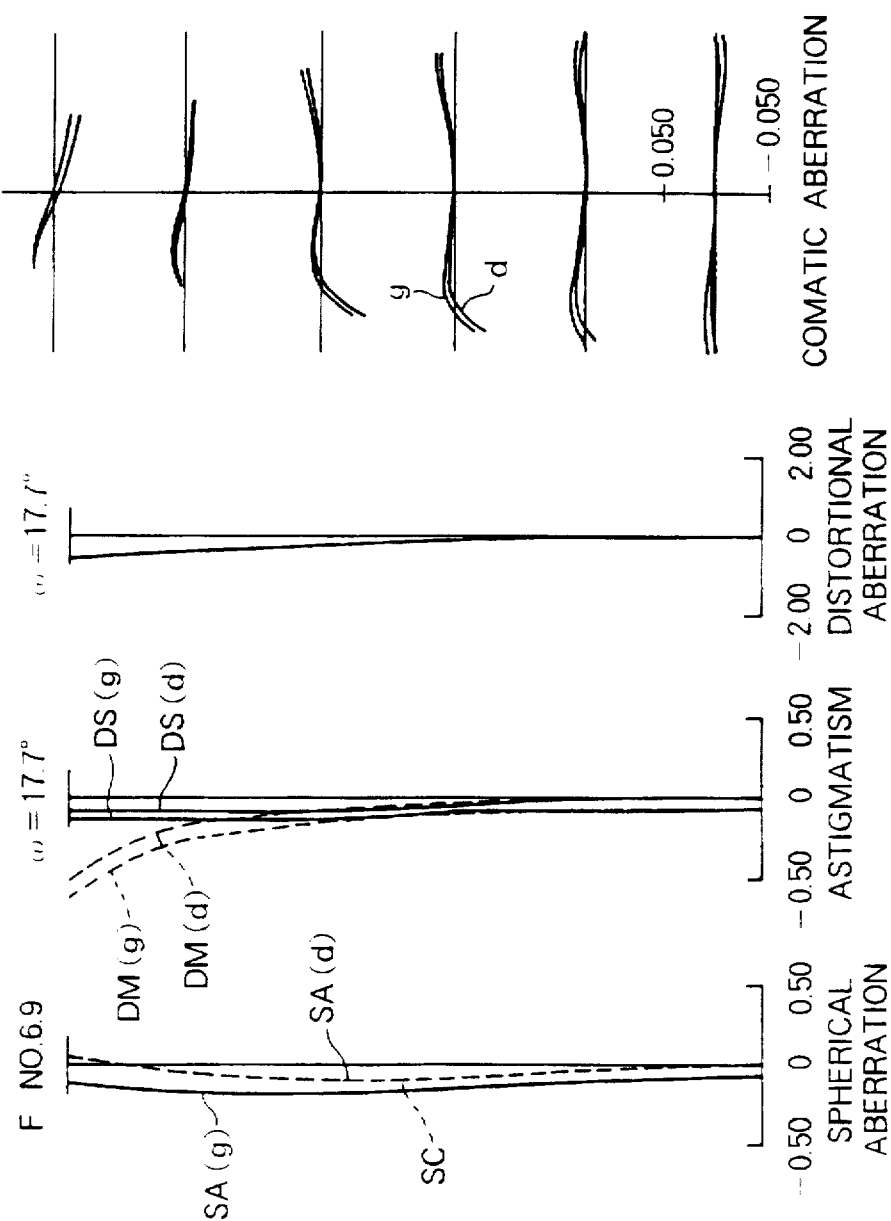

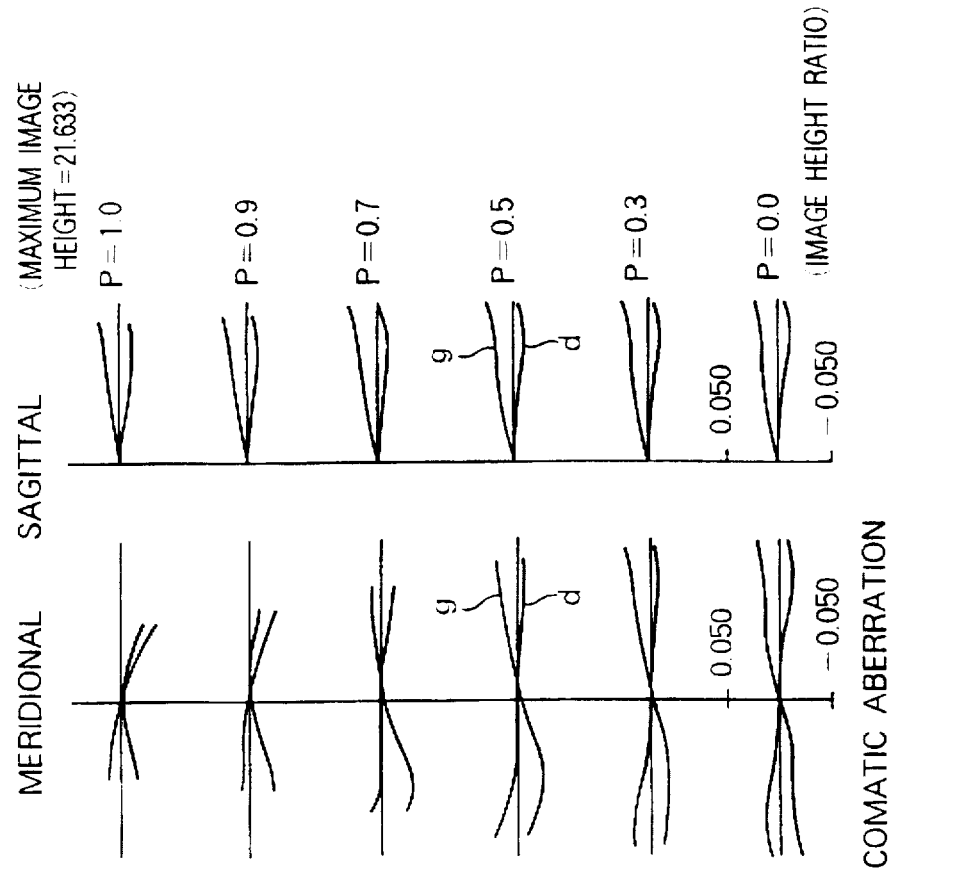
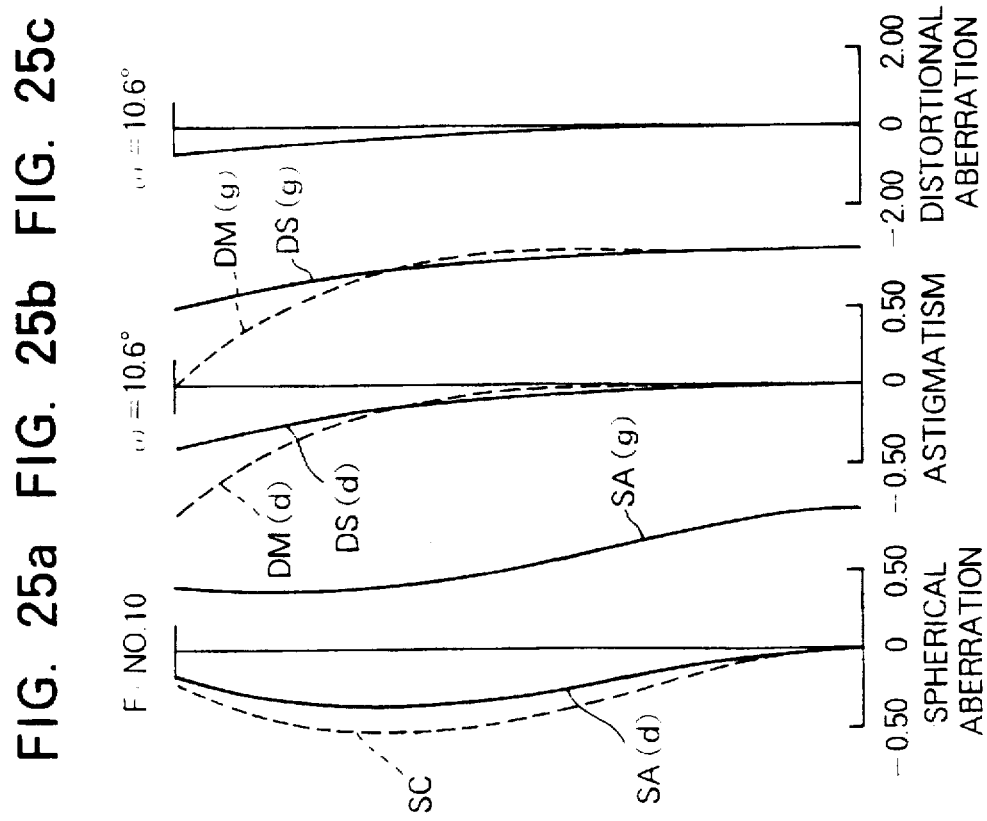
FIG. 25a  FIG. 25b  FIG. 25c  FIG. 25d  FIG. 25e

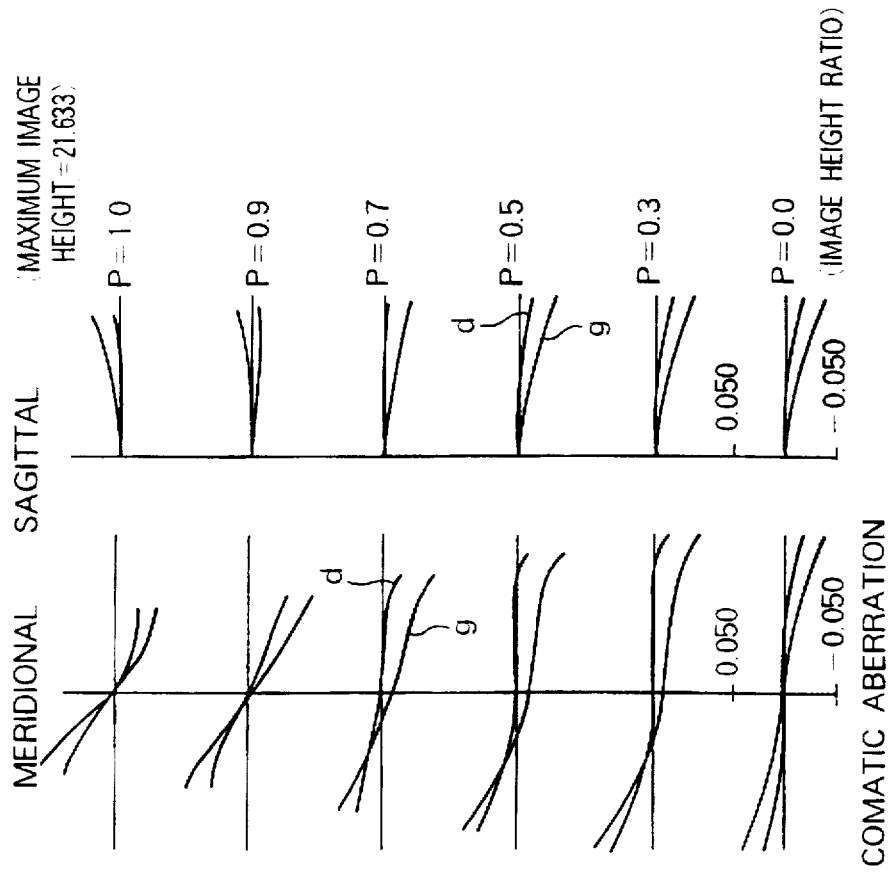
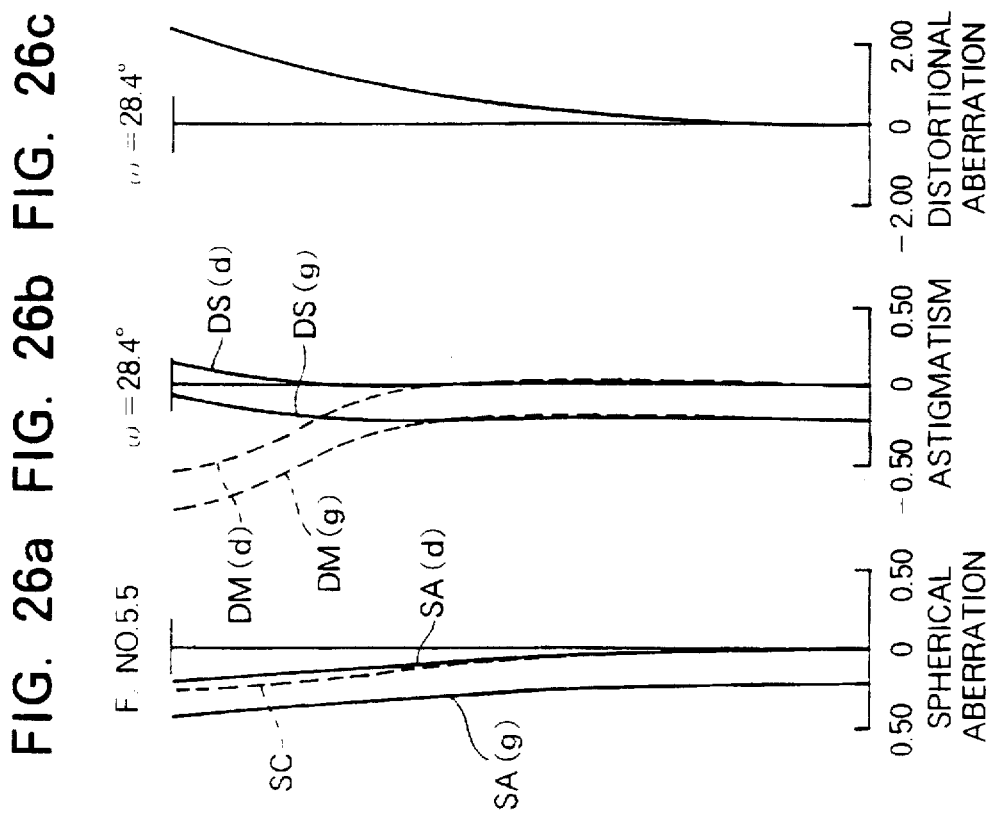
FIG. 26a  FIG. 26b  FIG. 26c  FIG. 26d  FIG. 26e

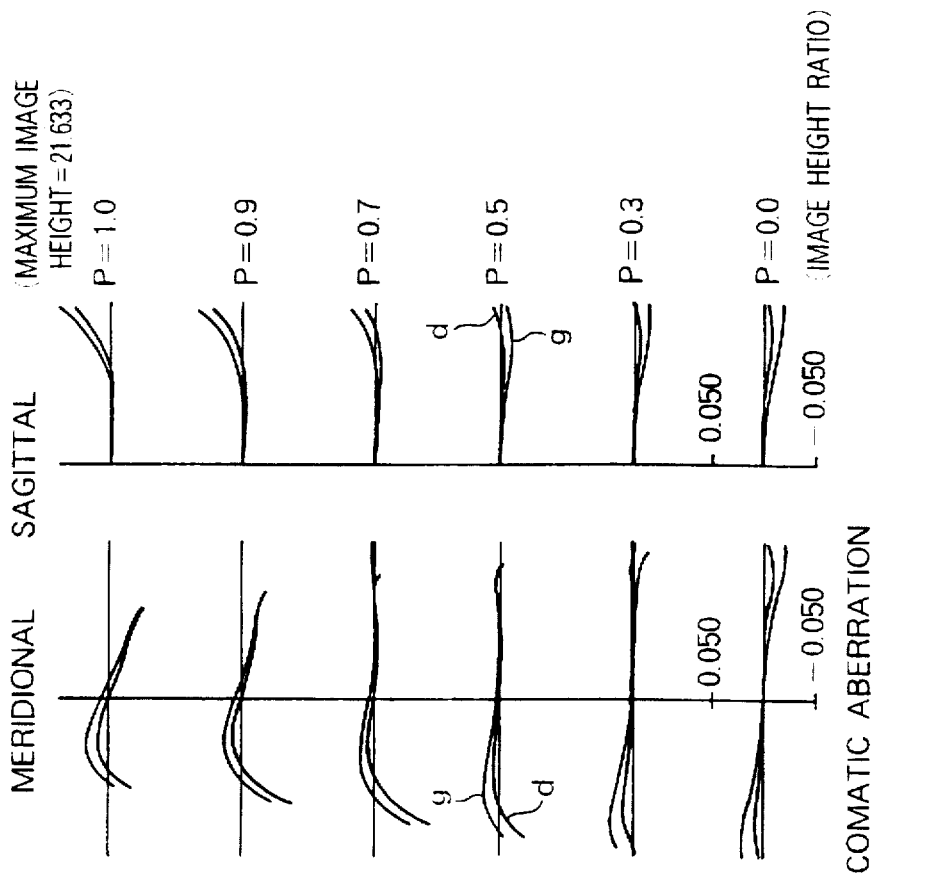
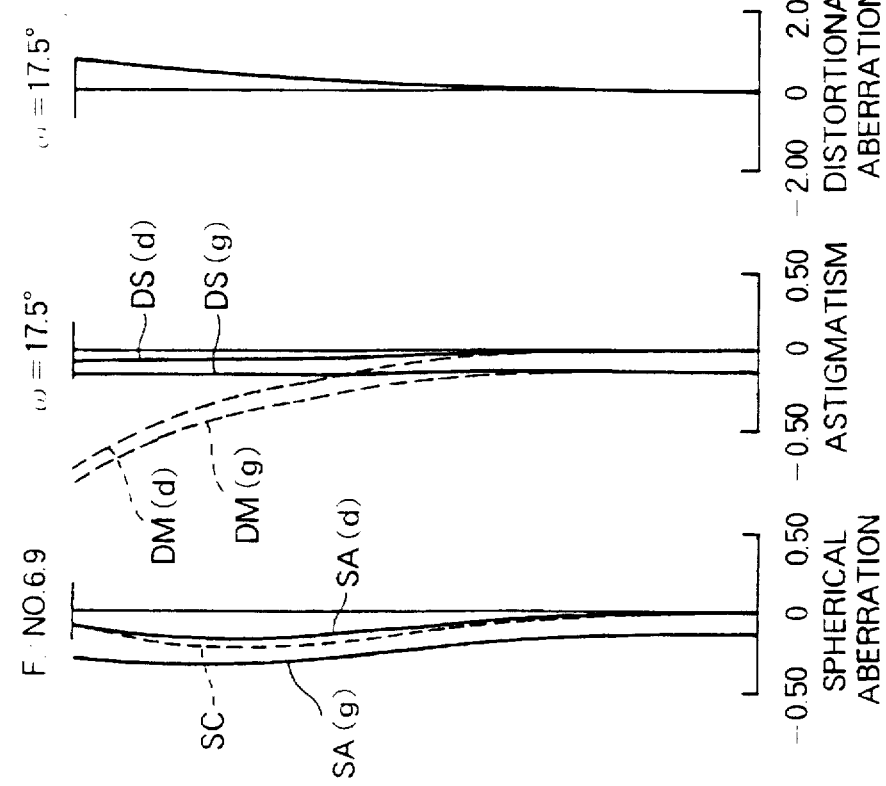

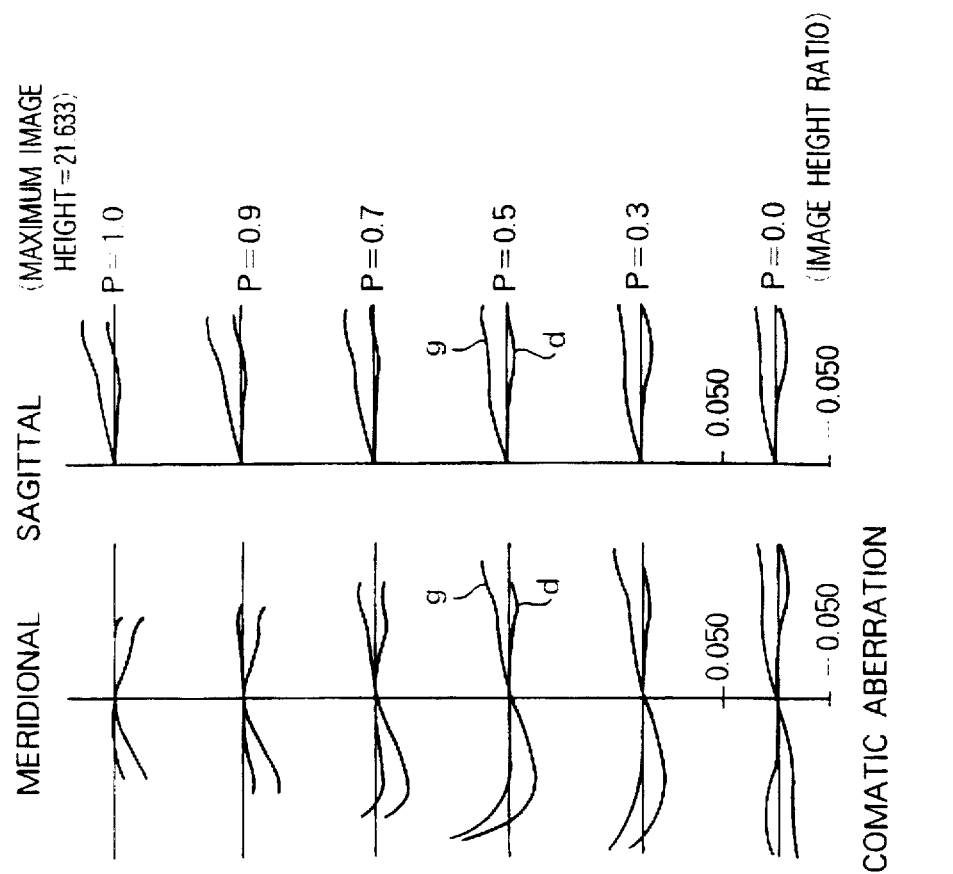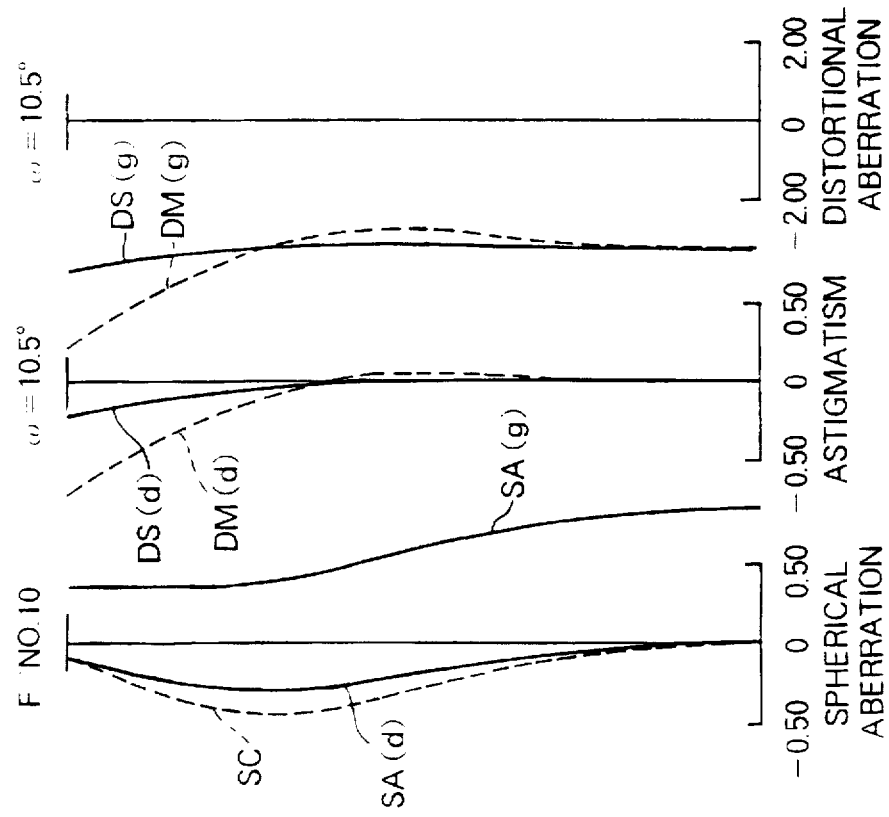

5,760,970

ZOOM LENS OF HIGH MAGNIFICATION

BACKGROUND OF THE INVENTION

1. Field of the Invention

The present invention relates to a zoom lens of high magnification which can be utilized as a zoom lens for a lens shutter camera.

2. Description of the Related Art

Recently, a lens shutter camera as a main current mounts a zoom lens thereon. A zoom ratio of the mounted zoom lens tends to be about three magnifications in many cases.

However, many generally known zoom lenses each having a zoom ratio of about three magnifications have a structure in which the number of constructional lenses is greater than ten. Accordingly, it is difficult to make the zoom lens compact and reduce cost of the zoom lens.

Japanese Patent Application Laying Open (KOKAI) No. 6-67093 shows a structure in which the number of constructional lenses is six and a zoom ratio is about 2.9 to 3.3. However, when the zoom ratio is greater than three magnifications, the number of aspherical surfaces is a large number equal to or greater than five and each of the shapes of the aspherical surfaces is complicated. Accordingly, the zoom lens is not necessarily manufactured easily so that there is a limit in a reduction in cost of the zoom lens.

SUMMARY OF THE INVENTION

It is therefore an object of the present invention to provide a zoom lens of high magnification in which a zoom ratio is a large value such as about 3 to 3.5 magnifications and the number of constructional lenses is six so that the zoom lens is compact and the number of aspherical surfaces is a small number from two to four.

The above object of the present invention can be achieved by a zoom lens of high magnification having first, second and third zoom groups which are sequentially arranged from an object side to an image side and respectively have a positive focal length, a positive focal length and a negative focal length;

the zoom lens being constructed such that the entire first to third zoom groups are moved onto the object side by zooming from a wide angle end for arranging the first and second zoom groups in proximity to each other to a telescopic end for arranging the second and third zoom groups in proximity to each other while a distance between the second and third zoom groups is reduced;

the first zoom group has one positive lens and one negative lens;

the second zoom group has a meniscus negative lens and a biconvex positive lens sequentially arranged from the object side toward the image side such that the meniscus negative lens has a strong concave face directed onto the object side;

the third zoom group is constructed by six lenses having one positive lens and one negative lens;

a focal length $f_1$ of the first zoom group, a combined focal length $f_T$ of the entire lens system at the telescopic end, a focal length $f_2$ of the second zoom group and a combined focal length $f_W$ of the entire lens system at the wide angle end satisfy the following conditions;

$$0.9 < f_1/f_T < 1.5 \quad (1)$$

$$0.6 < f_2/f_W < 0.85 \quad (2)$$

and one lens face or more of the second zoom group and one lens face of more of the third zoom group are constructed by aspherical surfaces.

In this construction, a zoom ratio is a large value such as about 3 to 3.5 magnifications and the number of constructional lenses is six so that the zoom lens is compact and the number of aspherical surfaces is a small number from two to four.

Further objects and advantages of the present invention will be apparent from the following description of the preferred embodiments of the present invention as illustrated in the accompanying drawings.

BRIEF DESCRIPTION OF THE DRAWINGS

FIGS. 8a to 8e are aberrational diagrams with respect to a wide angle end of the zoom lens in the embodiment 1;

FIGS. 9a to 9e are aberrational diagrams with respect to an intermediate focal length of the zoom lens in the embodiment 1;

FIGS. 10a to 10e are aberrational diagrams with respect to a telescopic end of the zoom lens in the embodiment 1;

FIGS. 11a to 11e are aberrational diagrams with respect to the wide angle end of the zoom lens in the embodiment 2;

FIGS. 12a to 12e are aberrational diagrams with respect to an intermediate focal length of the zoom lens in the embodiment 2;

FIGS. 13a to 13e are aberrational diagrams with respect to a telescopic end of the zoom lens in the embodiment 2;

FIGS. 15a to 15e are aberrational diagrams with respect to an intermediate focal length of the zoom lens in the embodiment 3;

FIGS. 17a to 17e are aberrational diagrams with respect to the wide angle end of the zoom lens in the embodiment 4;

FIGS. 18a to 18e are aberrational diagrams with respect to an intermediate focal length of the zoom lens in the embodiment 4;

FIGS. 19a to 19e are aberrational diagrams with respect to a telescopic end of the zoom lens in the embodiment 4;

FIGS. 20a to 20e are aberrational diagrams with respect to the wide angle end of the zoom lens in the embodiment 5;

FIGS. 21a to 21e are aberrational diagrams with respect to an intermediate focal length of the zoom lens in the embodiment 5;

FIGS. 22a to 22e are aberrational diagrams with respect to a telescopic end of the zoom lens in the embodiment 5;

FIGS. 24a to 24e are aberrational diagrams with respect to an intermediate focal length of the zoom lens in the embodiment 6;

FIGS. 25a to 25e are aberrational diagrams with respect to a telescopic end of the zoom lens in the embodiment 6;

FIGS. 26a to 26e are aberrational diagrams with respect to the wide angle end of the zoom lens in the embodiment 7;

FIGS. 27a to 27e are aberrational diagrams with respect to an intermediate focal length of the zoom lens in the embodiment 7; and FIGS. 28a to 28e are aberrational diagrams with respect to a telescopic end of the zoom lens in the embodiment 7.

DESCRIPTION OF THE PREFERRED EMBODIMENTS

The preferred embodiments of a zoom lens of high magnification in the present invention will next be described in detail with reference to the accompanying drawings.

Figure 1A:
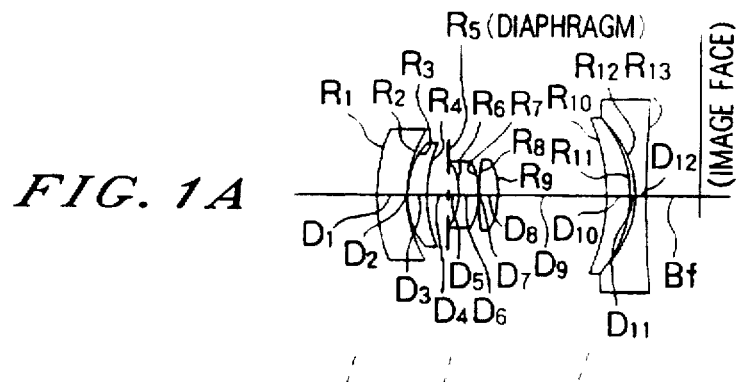
FIGS. 1a–1c are views for explaining the construction of a zoom lens having a large diameter in an embodiment 1 of the present invention and movements of respective zoom groups caused by zooming.
Figure 1B:
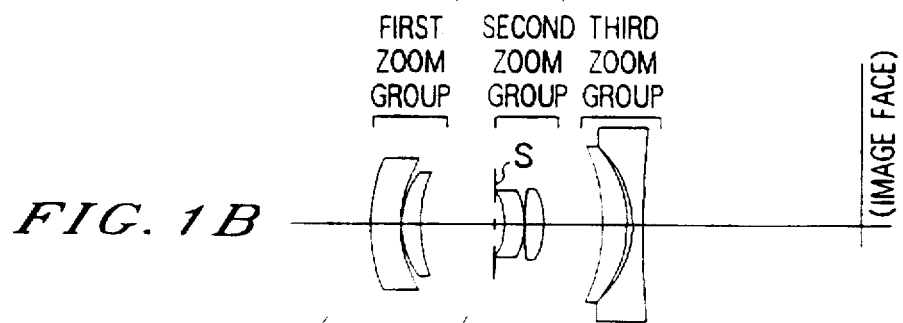

As shown in FIG. 1(b), a zoom lens of high magnification in the present invention has first to third zoom groups sequentially arranged from an object side (the left-hand side in FIG. 1(b)) toward an image side (the right-hand side in FIG. 1(b)).

Each of the first and second zoom groups has a positive focal length. The third zoom group has a negative focal length. Accordingly, the first, second and third zoom groups respectively have positive, positive and negative refracting powers as a whole.

The first and second zoom groups are arranged in proximity to each other at a wide angle end of the zoom lens shown in FIG. 1(a). A distance between the second and third zoom groups is long at the wide angle end.

Figure 1C:
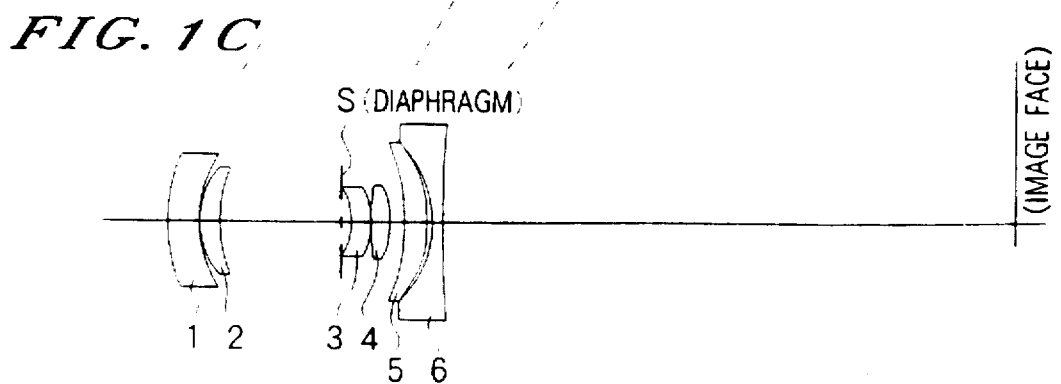

The second and third zoom groups are arranged in proximity to each other at a telescopic end of the zoom lens shown in FIG. 1(c). A distance between the first and second zoom groups is long at the telescopic end.

As shown in FIGS. 1a-1c, each of the first to third zoom groups is moved onto the object side in a zooming operation from the wide angle end to the telescopic end. However, a moving speed of the second zoom group is low in comparison with the first and third zoom groups. Therefore, the distance between the second and third zoom groups is gradually reduced as the zooming operation is performed.

As shown in FIG. 1(c), the first zoom group is constructed by two lenses composed of a first lens 1 and a second lens 2. One of these two lenses is a positive lens and the other is a negative lens.

As shown in FIG. 1(c), the second zoom group has a third lens 3 and a fourth lens 4 sequentially arranged from the object side toward the image side. The third lens 3 is constructed by a meniscus negative lens having a strong concave face directed onto the object side. The fourth lens 4 is constructed by a biconvex positive lens.

As shown in FIG. 1(c), the third zoom group is constructed by two lenses composed of a fifth lens 5 and a sixth lens 6. One of these two lenses is a positive lens and the other is a negative lens. In FIGS. 1b-1c, reference numeral S designates a diaphragm.

The zoom lens of high magnification in the present invention is constructed by the three zoom groups and comprises six lens groups composed of six lenses.

In accordance with a first construction of the present invention, a focal length $f_1$ of the first zoom group, a combined focal length $f_T$ of the entire lens system at the telescopic end, a focal length $f_2$ of the second zoom group and a combined focal length $f_W$ of the entire lens system at the wide angle end satisfy the following conditions.

$$0.9 < f_1/f_T < 1.5 \quad (1)$$

$$0.6 < f_2/f_W < 0.85 \quad (2)$$

One lens face or more of the second zoom group and one lens face of more of the third zoom group are constructed by aspherical surfaces.

In accordance with a second construction of the present invention, a curvature radius $r_{21}$ of a concave face of the meniscus negative lens of the second zoom group on the object side and a curvature radius $r_{22}$ of a convex face of the meniscus negative lens of the second zoom group on the image side in the above first construction satisfy the following condition.

$$2.5 < |(r_{21}+r_{22})/(r_{21}-r_{22})| < 7 \quad (3)$$

In accordance with a third construction of the present invention, a lens of the third zoom group on the object side is a positive lens and at least one face of this positive lens is an aspherical surface in the first or second construction.

In accordance with a fourth construction of the present invention, a focusing operation is performed by moving the second zoom group onto the object side in the first, second or third construction.

In accordance with a fifth construction of the present invention, a diaphragm is arranged before the second zoom group in the fourth construction and can be moved integrally with the second zoom group at zooming and focusing times.

In accordance with a sixth construction of the present invention, a diaphragm is arranged before the second zoom group in the fourth construction and can be moved integrally with the second zoom group at a zooming time and can be fixed at a focusing time. A distance between the second zoom group and the diaphragm can be reduced by moving the second zoom group onto a diaphragm side.

In accordance with a seventh construction of the present invention, at least one lens of the second zoom group and one lens of the third zoom group can be constructed by adhering a thin resin layer onto a spherical surface and forming an aspherical surface on a surface of the resin layer in one of the first to sixth constructions.

Figure 5A:
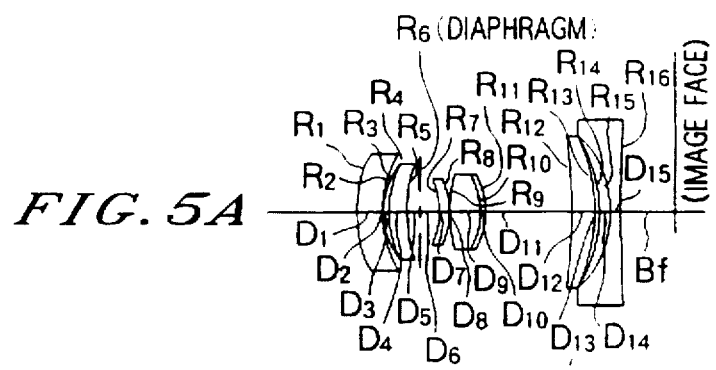
FIGS. 5a–5c are views showing a lens arrangement at a wide angle end of a zoom lens in accordance with an embodiment 5 and movements of respective zoom groups caused by zooming.
Figure 5B:
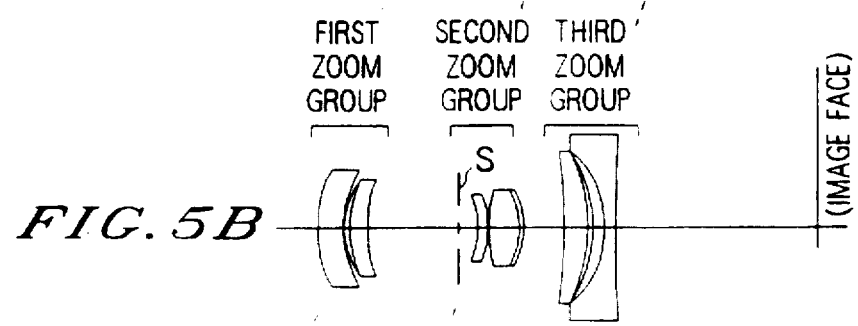
Figure 5C:
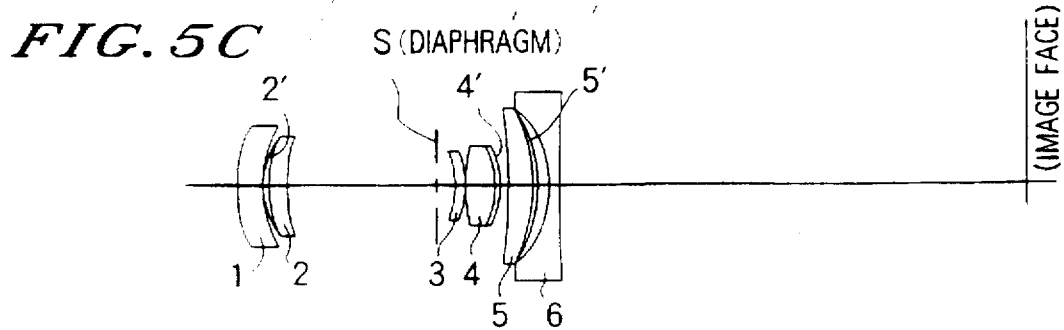

For example, in FIG. 5(c), thin resin layers 2', 4' and 5' are adhered onto respective one faces (spherical surfaces) of a second lens 2, a fourth lens 4 and a fifth lens 5. A surface of each of these thin resin layers is set to an aspherical surface.

As mentioned above, the zoom lens of high magnification in the present invention is constructed by three zoom groups having positive, positive and negative focal lengths. It is necessary to particularly reduce and correct chromatic aberration among aberrations of the respective zoom groups so as to obtain high zooming performance in an entire zoom region in the zoom lens having such a construction.

In the present invention, each of the first to third zoom groups is constructed by one positive lens and one negative lens from such a view point.

When the zoom lens is constructed by two zoom groups having positive and negative focal lengths, there is a limit in realization of high zoom ratio.

In the present invention, the first zoom group having a positive focal length is further added before the two zoom groups having positive and negative focal lengths. Thus, a high zoom ratio is realized without increasing moving amounts of the respective zoom groups. In particular, a pupil diameter on a telescopic side is increased and F/No is reduced without increasing a diaphragm diameter so that high performance of the zoom lens is realized by properly sharing aberrations.

An image point of the first zoom group is an object point of the second zoom group. When the first and second zoom groups are separated from each other at a telescopic end as in the present invention, it is preferable to restrict a focal length $f_1$ of the first zoom group in relation to a combined focal length $f_T$ of an entire lens system at the telescopic end as a condition for properly setting a distance between the first and second zoom groups at the telescopic end.

When $f_1/f_T$ exceeds a lower limit in the condition (1), refracting power of the first zoom group is excessively increased so that a light beam is rapidly converged in a wide portion of a light beam width, thereby causing comatic aberration.

In contrast to this, when $f_1/f_T$ exceeds an upper limit in the condition (1), merits obtained by adding the first zoom group of positive refracting power are reduced. In this case, the moving amounts of the respective zoom groups and the diaphragm diameter are increased so that it is difficult to share aberrations. This zoom lens approaches a zoom lens constructed by two zoom groups having positive and negative focal lengths so that no high performance of the zoom lens can be realized.

The condition (2) prescribes a proper range of the focal length of the second zoom group in the three zoom groups having the positive, positive and negative focal lengths as mentioned above.

When parameter $f_2/f_W$ in the condition (2) is reduced, positive refracting power of the second zoom group is relatively strengthened so that it is advantageous to make the zoom lens compact. However, when $f_2/f_W$ exceeds a lower limit in the condition (2), spherical aberration on a wide angle side is insufficiently corrected. When a focusing operation is performed by moving the second zoom group as in the fourth construction of the present invention and $f_2/f_W$ exceeds the lower limit in the condition (2), the spherical aberration is greatly varied by the focusing operation.

In contrast to this, when $f_2/f_W$ exceeds an upper limit in the condition (2), refracting power of the second zoom group becomes insufficient and back focus is increased so that it is difficult to make the zoom lens compact in an entire zoom region.

In the zoom lens of the present invention, the first zoom group has the positive focal length so that a light beam is diaphragmed by the first zoom group. However, the distance between the first and second zoom groups is increased on a telescopic side. Accordingly, a light beam width is narrowed and the light beam is incident to the second zoom group. Therefore, corrections of distortional aberration on the wide angle side and comatic aberration on the telescopic side can be consistent with each other by setting a first lens face of the second zoom group to a strong concave face of a meniscus negative lens.

The comatic aberration can be corrected by using many aspherical surfaces. However, in the present invention, the number of aspherical surfaces can be restrained to two to four by using the above construction.

The second zoom group mainly takes an image forming action. When this second zoom group is constructed by two lenses having positive and negative focal lengths, the burden of a biconvex lens as a positive lens particularly tends to be large so that spherical aberration is negatively increased. Therefore, it is effective to particularly use an aspherical surface on an image side having a large angle of refraction such that positive refracting power is weakened toward a peripheral lens portion.

Light beams having different field angles, i.e., different incident angles are transmitted through the third zoom group at a wide field angle in a separating state. Therefore, when an aspherical surface is used in the third zoom group, field curvature can be slightly adjusted in accordance with an individual field angle. Further, it is possible to correct distortional aberration tending to be positively increased.

The condition (3) prescribes a meniscus degree (a meniscus shape) of a meniscus negative lens arranged on an object side of the second zoom group.

When an absolute value in the condition (3) exceeds a lower limit in this condition, distortional aberration on the wide angle side can be preferably corrected, but a sum of aberrations of the second zoom group is increased. The number of constructional lenses must be increased to correct this sum. In contrast to this, when the absolute value exceeds an upper limit in the condition (3), correction effects of the distortional aberration of an object side face (a concave face) and a comatic divergence property of a lower ray becomes insufficient so that it is difficult to achieve preferable performance of the zoom lens.

The third zoom group is arranged near an image face at a wide angle end of the zoom lens so that a lens on an image face side is relatively increased in size. Therefore, when a lens on an object side reduced in effective diameter is set to a positive lens and an aspherical surface is used in this positive lens as in the third construction of the present invention, it is advantageous in cost and quality to use processing of glass molding and a processing method in which an aspherical surface is formed on a thin resin layer (in the seventh construction) in an ultraviolet ray hardening method, etc.

When the focusing operation is performed by the zoom lens constructed by three zoom groups having positive, positive and negative focal lengths as in the present invention, a front or rear lens diameter is increased, or a peripheral light amount is reduced at a near distance photographing time in a system in which the first zoom group is drawn out or the third zoom group is drawn in, respectively.

When the focusing operation is performed by moving the second zoom group as in the fourth construction of the present invention, an effective diameter of the second zoom group is minimized and a focusing mechanism can be compactly constructed. Further, a reduction in the peripheral light amount caused by the focusing operation is small.

In the zoom lens, it is preferable to generally arrange a diaphragm near a zoom group mainly taking an image forming action. However, when the diaphragm is arranged within this zoom group, lenses are arranged on both sides of the diaphragm so that a lens mechanism is complicated and it is difficult to assemble the lenses on both sides of the diaphragm by correcting eccentricity of each of these lenses with high accuracy. Further, influences of this eccentricity greatly appear since aberrations corrected in a zoom group unit are divided by the diaphragm.

When the diaphragm is arranged after the zoom group mainly taking the image forming action, a front lens diameter tends to be increased so as to maintain the peripheral light amount.

Therefore, in the fifth construction of the present invention, the diaphragm is arranged on an object side of the second zoom group as the zoom group mainly taking the image forming action. The diaphragm is moved integrally with the second zoom group at zooming and focusing times.

Further, when the diaphragm (as a shutter) is fixedly constructed at the focusing time as in the sixth construction of the present invention, the second zoom group as a focusing zoom group can be moved by a focus motor integral with a shutter unit so that no focusing ring is required.

Seven concrete embodiments of the present invention will next be described.

As shown in FIG. 1a, a radius of curvature of an i-th face (including a diaphragm face) counted from an object side is set to $R_i$ (a radius of curvature on an optical axis with respect to an aspherical surface). A distance on the optical axis between the i-th face and an (i+1)-face is set to $D_i$. A refractive index and an Abbe's number of the material of a j-th lens counted from the object side with respect to d-line are respectively set to $N_j$ and $v_j$. Further, f, Bf, F/No and ω are respectively set to a focal length of the entire lens system, a back focus, brightness and a half field angle.

When a Z-axis is set to be in conformity with the optical axis and a Y-axis is set to be perpendicular to the optical axis, an aspherical surface is a curved surface obtained by rotating a curve represented by the following formula $$Z=(1/R)^2Y^2/[1+\sqrt{1-(1+K)(Y/R)^2}]+A\cdot Y^4+B\cdot Y^6+C\cdot Y^8+D\cdot Y^{10}$$

around the optical axis. In this formula, R is a paraxial curvature radius on the optical axis and K is a conical constant. Further, A, B, C and D are aspherical coefficients of higher orders. A shape of this aspherical surface is specified by providing the paraxial curvature radius R on the optical axis, the conical constant K and the aspherical coefficients A, B, C and D. In notation of the aspherical surface, E and a number subsequent to this E show a power. For example, "E-9" shows $10^{-9}$ and this value $10^{-9}$ is multiplied by a numeric value before this value.

Embodiment 1

| i | $R_i$ | $D_i$ | j | $N_j$ | $v_j$ |
|---|---|---|---|---|---|
| 1 | 23.936 | 4.64 | 1 | 1.84666 | 23.83 |
| 2 | 17.482 | 0.1 | | | |
| 3 | 11.704 | 2.657 | 2 | 1.51742 | 52.15 |
| 4 | 17.834 | variable | | | |
| 5 | ∞(diaphragm) | 1.665 | | | |
| 6 | −10.533 | 2.79 | 3 | 1.83400 | 37.34 |
| 7 | −18.674 | 0.1 | | | |
| 8 | 37.144 | 3.252 | 4 | 1.48749 | 70.44 |
| 9 | −11.07 | variable | | | |
| 10 | −24.569 | 3.627 | 5 | 1.68893 | 31.16 |
| 11 | −17.249 | 0.8 | | | |

-continued

| | | | | | |
|---|---|---|---|---|---|
| 12 | −14.586 | 1.6 | 6 | 1.62041 | 60.34 |
| 13 | 161.088 | | | | |

Aspherical surfaces

Third face:

K = −0.20357,
A = −1.43712E−6, B = −6.25696E−8,
C = 1.19722E−9, D = −1.00521E−11
Seventh face:

K = −1.61299,
A = 5.07692E−6, B = 2.24129E−6,
C = −1.12258E−7, D = 2.50172E−9
Ninth face:

K = −0.22677,
A = 4.73076E−5, B = −1.82532E−6,
C = 1.07814E−7, D = −2.25959E−9
Eleventh face:

K = −0.45924,
A = −4.74635E−5, B = 1.03391E−7,
C = −1.11913E−9, D = 2.86572E−12

Variable amounts

| | wide angle end | intermediate focal length | telescopic end |
|---|---|---|---|
| $D_4$ | 3.395 | 11.453 | 19.236 |
| $D_9$ | 17.061 | 8.494 | 2.358 |
| f | 39.14 | 68.0 | 131.01 |
| Bf | 8.5 | 33.963 | 87.202 |
| F/No | 4.8 | 6.9 | 11.4 |
| ω | 28.3 | 17.9 | 9.5 |

Parametric values in conditional formulas $f_1/f_T = 1.138$, $f_2/f_W = 0.701$,
$|(r_{21} + r_{22})/(r_{21} − r_{22})| = 3.59$ FIGS. 1a, 1b and 1c respectively show lens arrangements at a wide angle end, an intermediate focal length and a telescopic end of the zoom lens with respect to the embodiment 1. FIGS. 8a to 8e show aberrational diagrams at the wide angle end with respect to the embodiment 1. FIGS. 9a to 9e show aberrational diagrams at the intermediate focal length with respect to the embodiment 1. FIGS. 10a to 10e show aberrational diagrams at the telescopic end with respect to the embodiment 1. In FIGS. 8a, 9a and 10a showing spherical aberration, SA(d) and SA(g) respectively show spherical aberrations with respect to d-line and g-line, and SC shows a sine condition. In FIGS. 8b, 9b and 10b showing astigmatism, DS(d) and DS(g) respectively show sagittal image surfaces with respect to d-line and g-line, and DM(d) and DM(g) respectively show meridional image surfaces with respect to d-line and g-line.

Embodiment 2

| i | $R_i$ | $D_i$ | j | $N_j$ | $v_j$ |
|---|---|---|---|---|---|
| 1 | 23.477 | 4.791 | 1 | 1.84666 | 23.83 |
| 2 | 16.816 | 0.1 | | | |
| 3 | 11.778 | 2.798 | 2 | 1.51742 | 52.15 |
| 4 | 19.072 | variable | | | |
| 5 | ∞(diaphragm) | 1.651 | | | |
| 6 | −10.603 | 2.918 | 3 | 1.83400 | 37.34 |
| 7 | −18.567 | 0.1 | | | |
| 8 | 37.709 | 3.219 | 4 | 1.48749 | 70.44 |
| 9 | −11.305 | variable | | | |
| 10 | −24.515 | 3.563 | 5 | 1.68893 | 31.16 |

-continued

| | | | | | |
|---|---|---|---|---|---|
| 11 | −17.381 | 0.8 | | | |
| 12 | −14.662 | 1.6 | 6 | 1.62041 | 60.34 |
| 13 | 167.789 | | | | |

Aspherical surfaces

Third face:

$K = -0.18721$,
$A = -2.67508E-6$, $B = -6.50922E-8$,
$C = 1.00554E-9$, $D = -8.99805E-12$

Seventh face:

$K = -1.56799$,
$A = 3.88112E-6$, $B = 1.93598E-6$,
$C = -8.97733E-8$, $D = 1.97324E-9$

Ninth face:

$K = -0.21662$,
$A = 4.48209E-5$, $B = -1.50008E-6$,
$C = 8.36167E-8$, $D = -1.75611E-9$

Eleventh face:

$K = -0.47082$,
$A = -4.74154E-5$, $B = 9.81856E-8$,
$C = -1.02926E-9$, $D = 2.68839E-12$

Variable amounts

| | wide angle end | intermediate focal length | telescopic end |
|---|---|---|---|
| $D_4$ | 3.401 | 11.758 | 19.1 |
| $D_9$ | 16.849 | 8.3 | 2.369 |
| f | 39.13 | 68.0 | 126.1 |
| Bf | 8.5 | 33.52 | 81.95 |
| F/No | 4.8 | 6.9 | 11.4 |
| ω | 28.3 | 17.9 | 9.8 |

Figure 2A:
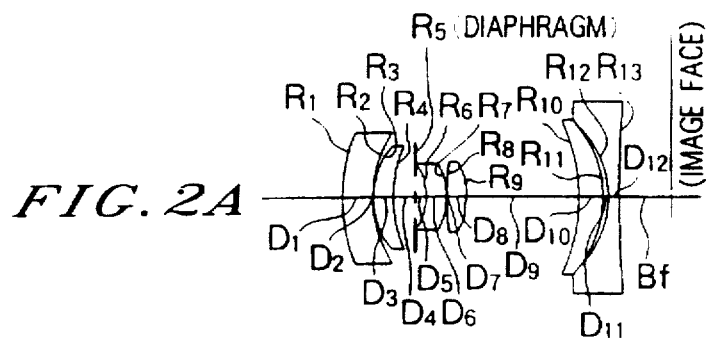
FIGS. 2a–2c are views showing a lens arrangement at a wide angle end of a zoom lens in accordance with an embodiment 2 and movements of respective zoom groups caused by zooming.
Figure 2B:
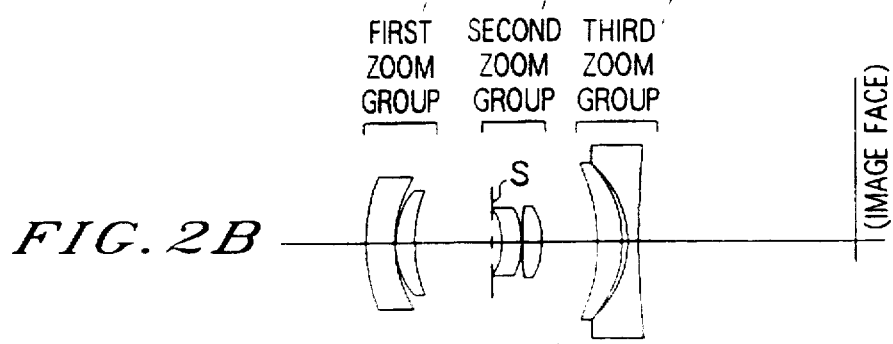
Figure 2C:
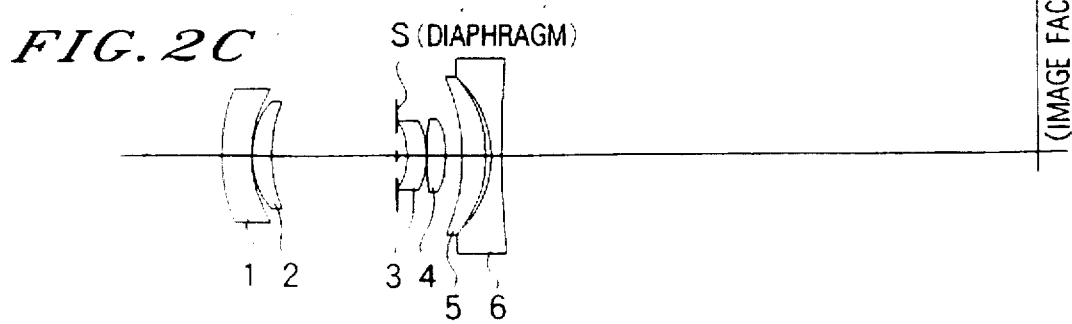

Parametric values in conditional formulas $f_1/f_T = 1.103$, $f_2/f_W = 0.703$,
$|(r_{21} + r_{22})/(r_{21} - r_{22})| = 3.66$ FIGS. 2a–2c show a lens arrangement at the wide angle end, an intermediate focal length and a telescopic end of a zoom lens with respect to the embodiment 2. FIGS. 11a to 11e show aberrational diagrams at the wide angle end with respect to the embodiment 2. FIGS. 12a to 12e show aberrational diagrams at the intermediate focal length with respect to the embodiment 2. FIGS. 13a to 13e show aberrational diagrams at the telescopic end with respect to the embodiment 2.

Embodiment 3

| i | $R_i$ | $D_i$ | j | $N_j$ | $v_j$ |
|---|---|---|---|---|---|
| 1 | 23.844 | 4.988 | 1 | 1.84666 | 23.83 |
| 2 | 16.763 | 0.1 | | | |
| 3 | 11.975 | 3.019 | 2 | 1.51742 | 52.15 |
| 4 | 20.687 | variable | | | |
| 5 | ∞(diaphragm) | 1.63 | | | |
| 6 | −10.836 | 3.061 | 3 | 1.83400 | 37.34 |
| 7 | −18.768 | 0.1 | | | |
| 8 | 37.205 | 3.362 | 4 | 1.48749 | 70.44 |
| 9 | −11.718 | variable | | | |
| 10 | −24.468 | 3.497 | 5 | 1.68893 | 31.16 |
| 11 | −17.624 | 0.8 | | | |
| 12 | −14.815 | 1.6 | 6 | 1.62041 | 60.34 |
| 13 | 171.662 | | | | |

Aspherical surfaces

Third face:

$K = -0.17499$,
$A = -3.35963E-6$, $B = -4.22070E-8$,
$C = 3.81779E-10$, $D = -3.85675E-12$

Seventh face:

$K = -1.38792$,
$A = 6.65074E-7$, $B = 1.84431E-6$,
$C = -8.77544E-8$, $D = 1.86468E-9$

Ninth face:

$K = -0.24045$,
$A = 4.74892E-5$, $B = -1.46334E-6$,
$C = 8.03472E-8$, $D = -1.64987E-9$

Eleventh face:

$K = -0.48159$,
$A = -4.72363E-5$, $B = 9.95298E-8$,
$C = -1.01462E-9$, $D = 2.78749E-12$

Variable amounts

| | wide angle end | intermediate focal length | telescopic end |
|---|---|---|---|
| $D_4$ | 3.346 | 11.676 | 18.391 |
| $D_9$ | 16.592 | 8.07 | 2.395 |
| f | 39.14 | 68.0 | 121.37 |
| Bf | 8.5 | 33.17 | 77.06 |
| f/No | 5.1 | 6.9 | 10.7 |
| ω | 28.3 | 17.9 | 10.2 |

Figure 3A:
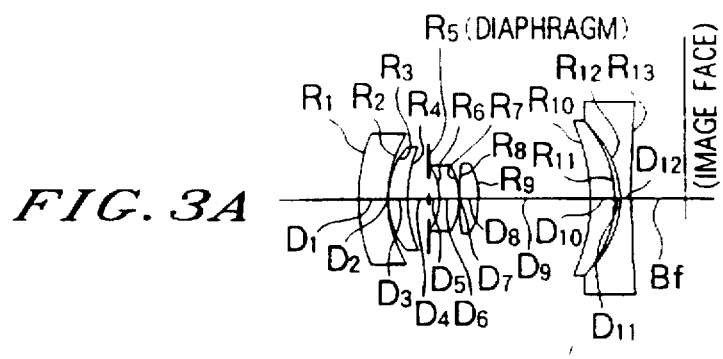
FIGS. 3a–3c are views showing a lens arrangement at a wide angle end of a zoom lens in accordance with an embodiment 3 and movements of respective zoom groups caused by zooming.
Figure 3B:
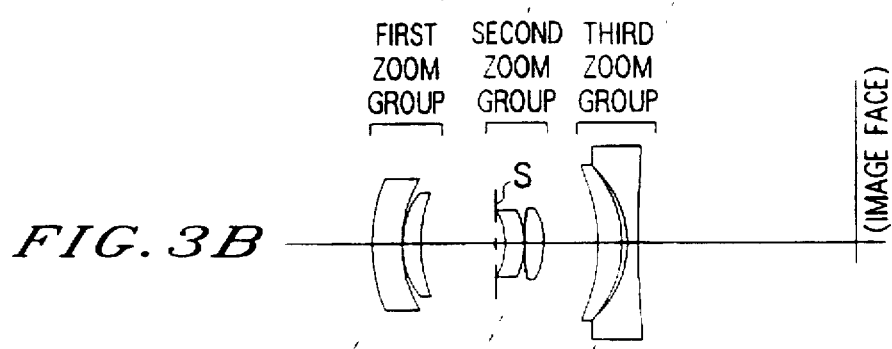
Figure 3C:
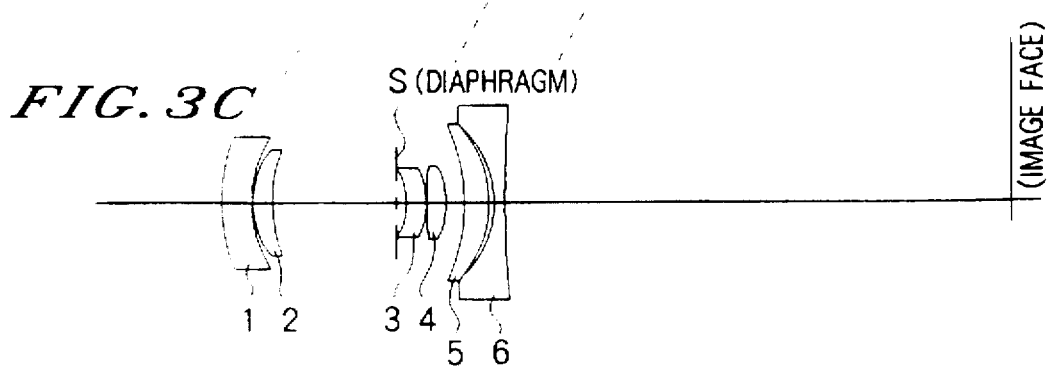

Parametric values in conditional formulas $f_1/f_T = 1.062$, $f_2/f_W = 0.706$,
$|(r_{21} + r_{22})/(r_{21} - r_{22})| = 3.73$ FIGS. 3a–3c show a lens arrangement at the wide angle end, an intermediate focal length and a telescopic end of a zoom lens with respect to the embodiment 3. FIGS. 14a to 14e show aberrational diagrams at the wide angle end with respect to the embodiment 3. FIGS. 15a to 15e show aberrational diagrams at the intermediate focal length with respect to the embodiment 3. FIGS. 16a to 16e show aberrational diagrams at the telescopic end with respect to the embodiment 3.

Embodiment 4

| i | $R_i$ | $D_i$ | j | $N_j$ | $v_j$ |
|---|---|---|---|---|---|
| 1 | 22.173 | 4.199 | 1 | 1.84666 | 23.83 |
| 2 | 15.965 | 0.1 | | | |
| 3 | 11.864 | 3.019 | 2 | 1.51742 | 52.15 |
| 4 | 20.558 | variable | | | |
| 5 | ∞(diaphragm) | 1.594 | | | |
| 6 | −10.475 | 2.845 | 3 | 1.83400 | 37.34 |
| 7 | −17.44 | 0.1 | | | |
| 8 | 38.134 | 3.333 | 4 | 1.48749 | 70.44 |
| 9 | −11.815 | variable | | | |
| 10 | −23.676 | 3.484 | 5 | 1.68893 | 31.16 |
| 11 | −17.817 | 0.8 | | | |
| 12 | −15.008 | 1.6 | 6 | 1.62041 | 60.34 |
| 13 | 204.996 | | | | |

Aspherical surfaces

Third face:

$K = -0.16689$,
$A = -3.37964E-6$, $B = -4.18889E-8$,
$C = 3.57489E-10$, $D = -3.91696E-12$

-continued

Seventh face:

K = −0.97484,
A = −8.62646E−7, B = 1.66534E−6,
C = −9.15615E−8, D = 1.95259E−9

Ninth face:

K = −0.31011,
A = 5.50290E−5, B = −1.40617E−6,
C = 8.81296E−8, D = −1.85552E−9

Eleventh face:

K = −0.45746,
A = −4.63952E−5, B = 1.01851E−7,
C = −1.03655E−9, D = 3.01739E−12

Variable amounts

|       | wide angle end | intermediate focal length | telescopic end |
|-------|----------------|---------------------------|----------------|
| $D_4$ | 3.247          | 11.861                    | 18.35          |
| $D_9$ | 16.772         | 7.865                     | 2.574          |
| f     | 38.1           | 68.0                      | 116.52         |
| Bf    | 7.8            | 33.4                      | 73.06          |
| F/No  | 5.0            | 6.9                       | 10.0           |
| ω     | 29.0           | 17.9                      | 10.6           |

Figure 4A:
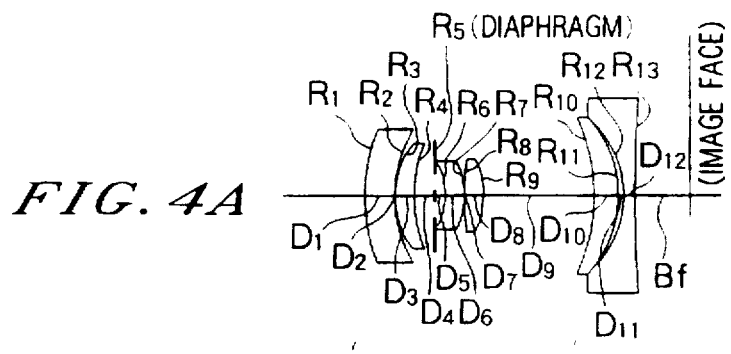
FIGS. 4a–4c are views showing a lens arrangement at a wide angle end of a zoom lens in accordance with an embodiment 4 and movements of respective zoom groups caused by zooming.
Figure 4B:
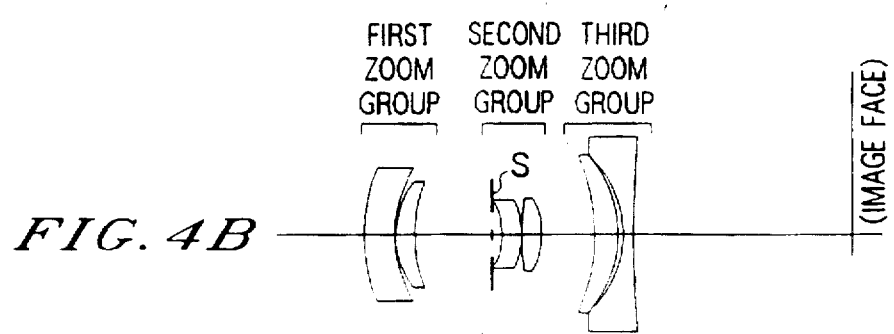
Figure 4C:
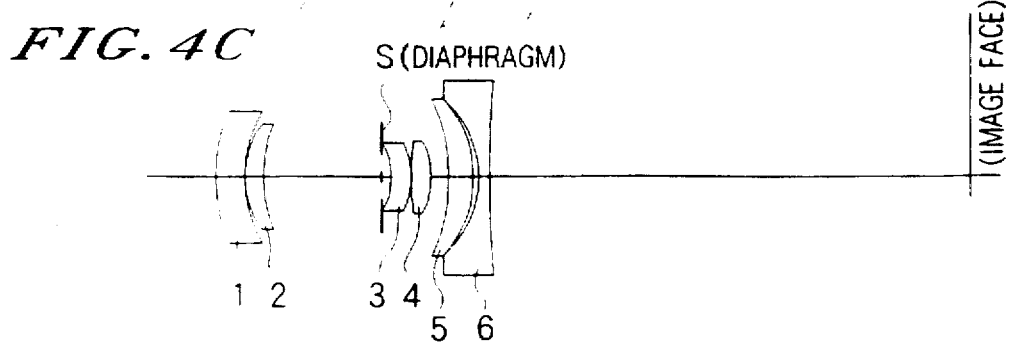

Parametric values in conditional formulas $f_1/f_T = 1.059$, $f_2/f_W = 0.728$,
$|(r_{21} + r_{22})/(r_{21} - r_{22})| = 4.01$ FIGS. 4a–4c show a lens arrangement at the wide angle end, an intermediate focal length and a telescopic end of a zoom lens with respect to the embodiment 4. FIGS. 17a to 17e show aberrational diagrams at the wide angle end with respect to the embodiment 4. FIGS. 18a to 18e show aberrational diagrams at the intermediate focal length with respect to the embodiment 4. FIGS. 19a to 19e show aberrational diagrams at the telescopic end with respect to the embodiment 4.

In the following embodiments 5 and 6, a second lens is constructed such that a thin resin layer (2') is adhered onto a spherical surface of the second lens on its object side and an aspherical surface is formed on this object side surface. Further, a fourth lens is constructed such that a thin resin layer (4') is adhered onto a spherical surface of the fourth lens on its image side and an aspherical surface is formed on an object side surface of the fourth lens. A fifth lens is constructed such that a thin resin layer (5') is adhered onto a spherical surface of the fifth lens on its image side and an aspherical surface is formed on an object side surface of the fifth lens. Such constructions constitute the seventh construction of the present invention.

Embodiment 5

| i  | $R_i$         | $D_i$    | j  | $N_j$   | $v_j$ |
|----|---------------|----------|----|---------|-------|
| 1  | 22.891        | 3.7      | 1  | 1.84666 | 23.78 |
| 2  | 15.853        | 0.23     |    |         |       |
| 3  | 12.934        | 0.43     | 2' | 1.52725 | 42.3  |
| 4  | 14.298        | 2.76     | 2  | 1.54814 | 45.82 |
| 5  | 23.455        | variable |    |         |       |
| 6  | ∞(diaphragm)  | 3.124    |    |         |       |
| 7  | −9.23         | 1.4      | 3  | 1.79950 | 42.34 |
| 8  | −13.409       | 0.1      |    |         |       |
| 9  | 45.46         | 4.63     | 4  | 1.48749 | 70.44 |
| 10 | −9.7289       | 0.2      | 4' | 1.52725 | 42.3  |
| 11 | −11.224       | variable |    |         |       |
| 12 | −59.749       | 3.71     | 5  | 1.68893 | 31.16 |
| 13 | −21.199       | 0.2      | 5' | 1.52725 | 42.3  |
| 14 | −33.677       | 2.43     |    |         |       |
| 15 | −13.8729      | 1.6      | 6  | 1.69680 | 55.46 |
| 16 | 480.505       |          |    |         |       |

Aspherical surfaces

Third face:

K = −0.22590,
A = 2.96900E−6, B = −1.15150E−7,
C = 2.25740E−9, D = −1.57810E−11

Eleventh face:

K = −0.44556,
A = 4.76930E−5, B = 3.45690E−7,
C = −1.51020E−8, D = 2.30290E−10

Fourteenth face:

K = 6.18580,
A = −5.49760E−5, B = 2.35590E−7,
C = 2.24660E−9, D = 8.11110E−12

Variable amounts

|          | wide angle end | intermediate focal length | telescopic end |
|----------|----------------|---------------------------|----------------|
| $D_5$    | 2.142          | 13.401                    | 22.85          |
| $D_{11}$ | 13.998         | 6.21                      | 1.322          |
| f        | 39.14          | 70.262                    | 126.2          |
| Bf       | 8.813          | 32.076                    | 71.37          |
| F/No     | 4.8            | 7.1                       | 10.5           |
| ω        | 28.4           | 17.3                      | 9.8            |

Parametric values in conditional formulas $f_1/f_T = 1.253$, $f_2/f_W = 0.710$,
$|(r_{21} + r_{22})/(r_{21} - r_{22})| = 5.42$ FIGS. 5a–5c show a lens arrangement at the wide angle end, an intermediate focal length and a telescopic end of a zoom lens with respect to the embodiment 5. FIGS. 20a to 20e show aberrational diagrams at the wide angle end with respect to the embodiment 5. FIGS. 21a to 21e show aberrational diagrams at the intermediate focal length with respect to the embodiment 5. FIGS. 22a to 22e show aberrational diagrams at the telescopic end with respect to the embodiment 5.

Embodiment 6

| i  | $R_i$         | $D_i$    | j  | $N_j$   | $v_j$ |
|----|---------------|----------|----|---------|-------|
| 1  | 23.513        | 4.7      | 1  | 1.84666 | 23.83 |
| 2  | 15.959        | 0.33     |    |         |       |
| 3  | 13.433        | 0.2      | 2' | 1.52725 | 42.3  |
| 4  | 13.66         | 3.469    | 2  | 1.53172 | 48.84 |
| 5  | 27.645        | variable |    |         |       |
| 6  | ∞(diaphragm)  | 3.214    |    |         |       |
| 7  | −8.802        | 1.854    | 3  | 1.83400 | 37.34 |
| 8  | −13.425       | 0.1      |    |         |       |
| 9  | 58.657        | 3.249    | 4  | 1.48749 | 70.44 |
| 10 | −11.091       | 0.2      | 4' | 1.52725 | 42.3  |
| 11 | −10.639       | variable |    |         |       |
| 12 | −55.653       | 3.517    | 5  | 1.68893 | 31.16 |
| 13 | −22.106       | 0.412    | 5' | 1.52725 | 42.3  |
| 14 | −29.367       | 1.948    |    |         |       |
| 15 | −14.842       | 1.6      | 6  | 1.69350 | 53.34 |
| 16 | 426.223       |          |    |         |       |

-continued

| Aspherical surfaces |
|---|
| Third face: |
| $K = -0.16530$, |
| $A = -3.07273E-7$, $B = -1.01476E-8$, |
| $C = 4.55814E-11$, $D = -2.97622E-13$ |
| Eleventh face: |
| $K = -0.37757$, |
| $A = 5.55609E-5$, $B = 3.29589E-7$, |
| $C = -1.15953E-8$, $D = 1.85556E-10$ |
| Fourteenth face: |
| $K = -0.76779$, |
| $A = -6.48243E-5$, $B = 7.13680E-8$, |
| $C = -8.47616E-10$, $D = -4.51241E-13$ |

| | Variable amounts | | |
|---|---|---|---|
| | wide angle end | intermediate focal length | telescopic end |
| $D_5$ | 1.508 | 12.455 | 20.818 |
| $D_{11}$ | 14.885 | 6.409 | 0.9 |
| f | 39.13 | 67.975 | 116.436 |
| Bf | 9.0 | 31.675 | 67.9 |
| F/No | 4.8 | 6.9 | 10.0 |
| ω | 28.4 | 17.7 | 10.6 |

| Parametric values in conditional formulas |
|---|
| $f_1/f_T = 1.148$, $f_2/f_W = 0.733$, |
| $|(r_{21} + r_{22})/(r_{21} - r_{22})| = 4.81$ |

Figure 6A:
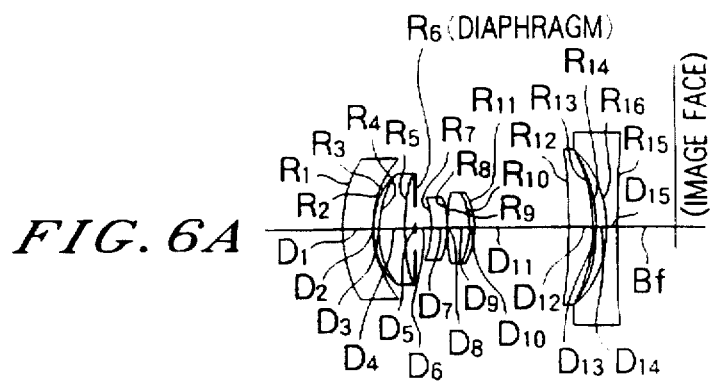
FIGS. 6a–6c are views showing a lens arrangement at a wide angle end of a zoom lens in accordance with an embodiment 6 and movements of respective zoom groups caused by zooming.
Figure 6B:
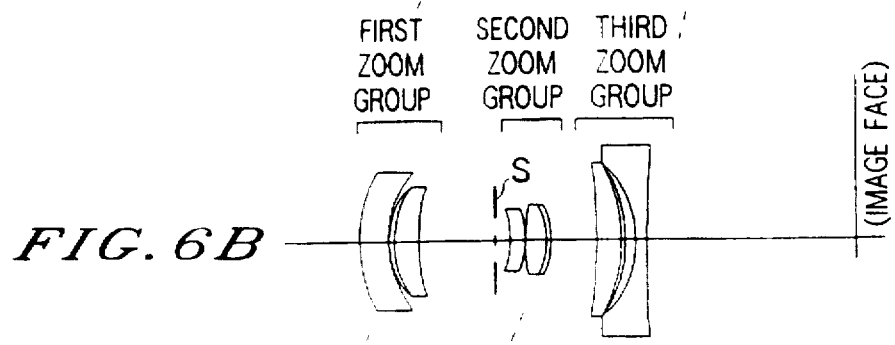
Figure 6C:
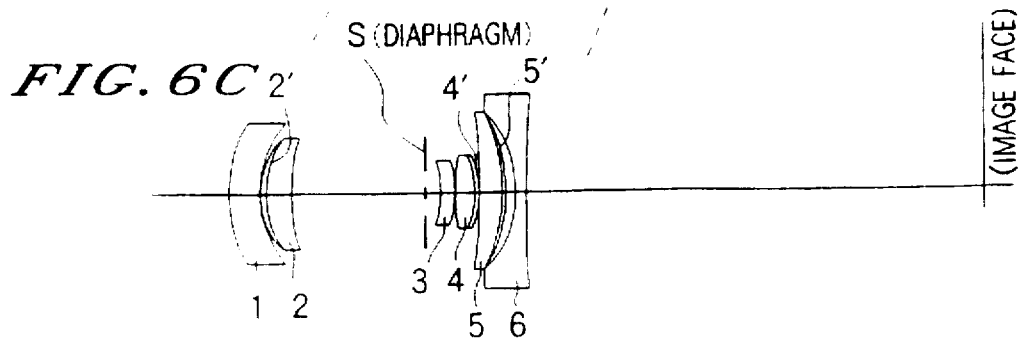

FIGS. 6a–6c show a lens arrangement at the wide angle end, an intermediate focal length and a telescopic end of a zoom lens with respect to the embodiment 6. FIGS. 23a to 23e show aberrational diagrams at the wide angle end with respect to the embodiment 6. FIGS. 24a to 24e show aberrational diagrams at the intermediate focal length with respect to the embodiment 6. FIGS. 25a to 25e show aberrational diagrams at the telescopic end with respect to the embodiment 6.

In the following final embodiment 7, a fourth lens is constructed such that a thin resin layer (4') is adhered onto a spherical surface of the fourth lens on its image side and an aspherical surface is formed on an object side surface of the fourth lens. A fifth lens is constructed such that a thin resin layer (5') is adhered onto a spherical surface of the fifth lens on its image side and an aspherical surface is formed on an object side surface of the fifth lens. Such constructions constitute the seventh construction of the present invention.

| Embodiment 7 | | | | | |
|---|---|---|---|---|---|
| i | $R_i$ | $D_i$ | j | $N_j$ | $v_j$ |
| 1 | 19.452 | 4.7 | 1 | 1.84666 | 23.83 |
| 2 | 12.795 | 1.206 | | | |
| 3 | 12.879 | 3.638 | 2 | 1.54072 | 47.2 |
| 4 | 30.97 | variable | | | |
| 5 | ∞(diaphragm) | 3.429 | | | |
| 6 | −8.713 | 2.079 | 3 | 1.83400 | 37.34 |
| 7 | −13.194 | 0.1 | | | |
| 8 | 71.344 | 3.25 | 4 | 1.48749 | 70.44 |
| 9 | −11.135 | 0.2 | 4' | 1.52725 | 42.3 |
| 10 | −10.68 | variable | | | |
| 11 | −62.806 | 3.8 | 5 | 1.68893 | 31.16 |
| 12 | −21.173 | 0.361 | 5' | 1.52725 | 42.3 |
| 13 | −27.743 | 1.859 | | | |
| 14 | −14.455 | 1.6 | 6 | 1.74330 | 49.22 |
| 15 | 480.505 | | | | |

-continued

| Aspherical surfaces |
|---|
| Tenth face: |
| $K = -0.36609$, |
| $A = 5.34734E-5$, $B = -1.29830E-7$, |
| $C = 1.67242E-8$, $D = -3.39651E-10$ |
| Thirteenth face: |
| $K = -0.47684$, |
| $A = -6.39209E-5$, $B = -6.01813E-9$, |
| $C = -5.09241E-10$, $D = -3.56612E-12$ |

| | Variable amounts | | |
|---|---|---|---|
| | wide angle end | intermediate focal length | telescopic end |
| $D_4$ | 1.55 | 11.0 | 20.196 |
| $D_{10}$ | 14.793 | 6.329 | 0.9 |
| f | 39.14 | 68.0 | 116.525 |
| Bf | 9.0 | 31.893 | 66.9 |
| F/No | 5.5 | 6.9 | 10.0 |
| ω | 28.4 | 17.5 | 10.5 |

| Parametric values in conditional formulas |
|---|
| $f_1/f_T = 1.088$, $f_2/f_W = 0.735$, |
| $|(r_{21} + r_{22})/(r_{21} - r_{22})| = 4.89$ |

Figure 7A:
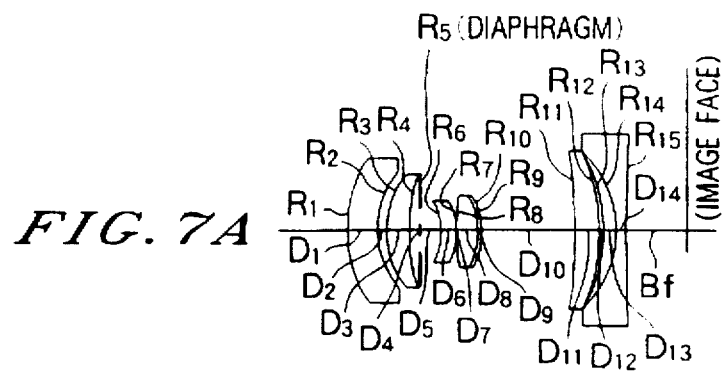
FIGS. 7a–7c are views showing a lens arrangement at a wide angle end of a zoom lens in accordance with an embodiment 7 and movements of respective zoom groups caused by zooming.
Figure 7B:
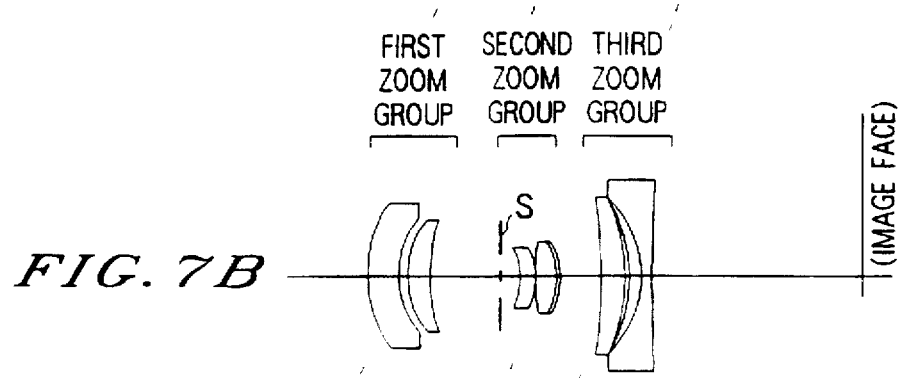
Figure 7C:
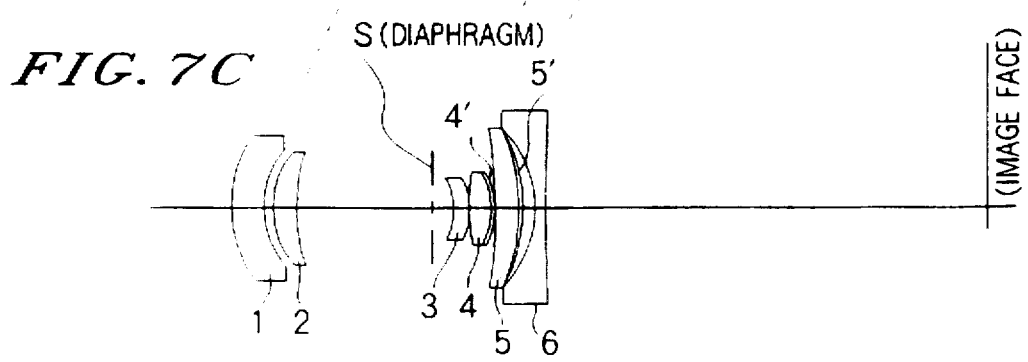
Figures 14A, 14B, 14C:
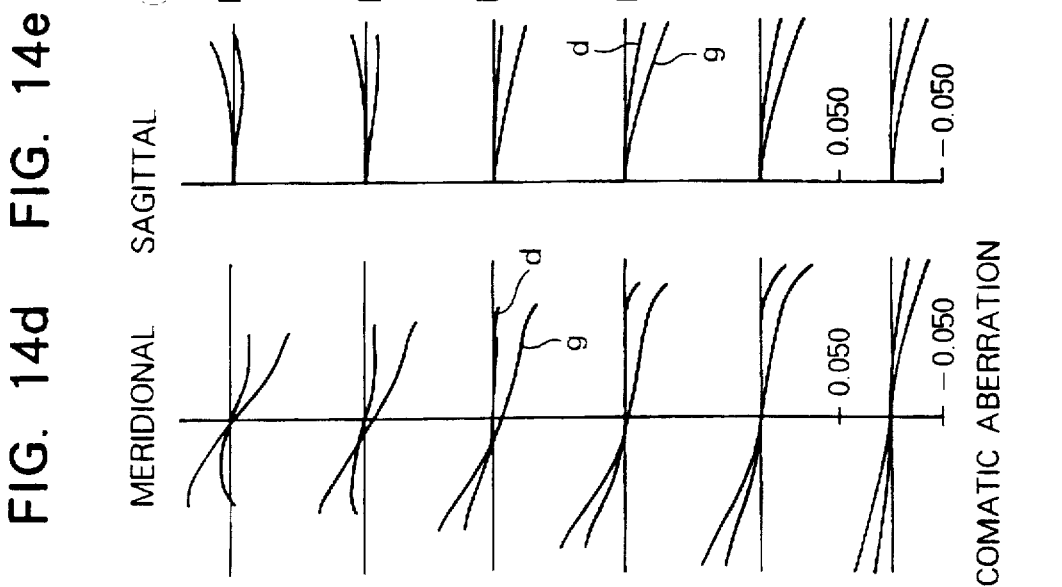
FIGS. 14a to 14e are aberrational diagrams with respect to the wide angle end of the zoom lens in the embodiment 3.
Figures 14D, 14E:
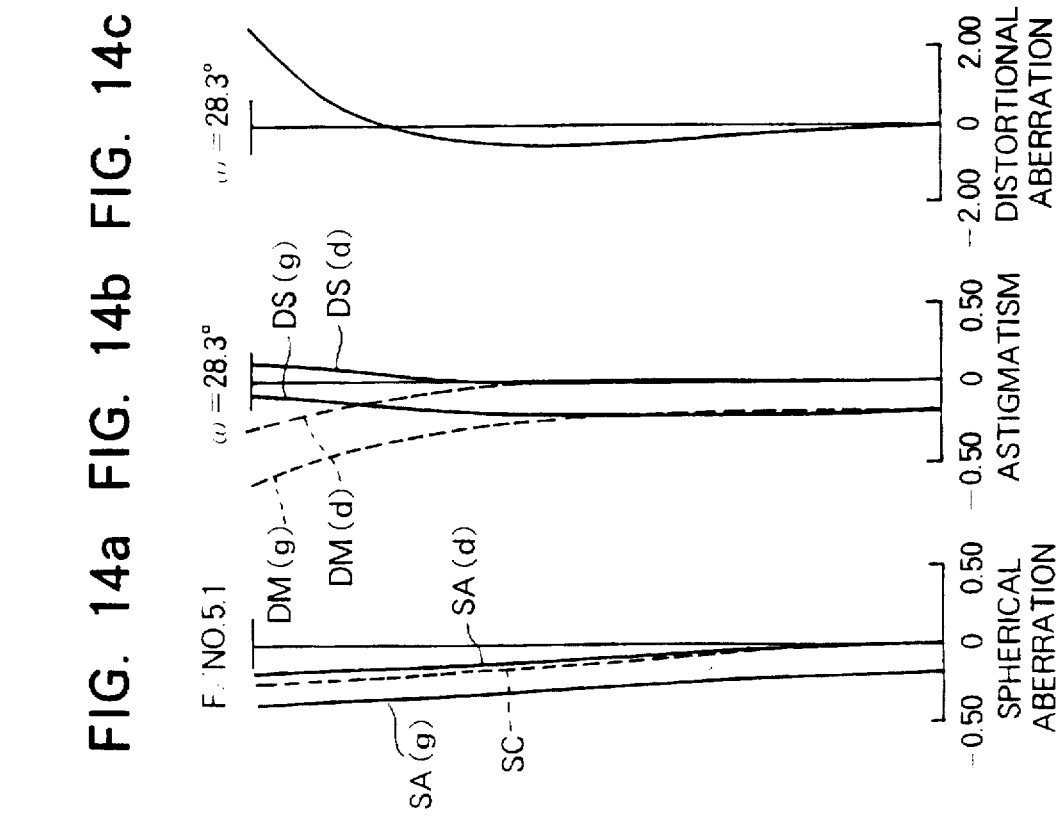
Figures 16A, 16B, 16C, 16D, 16E:
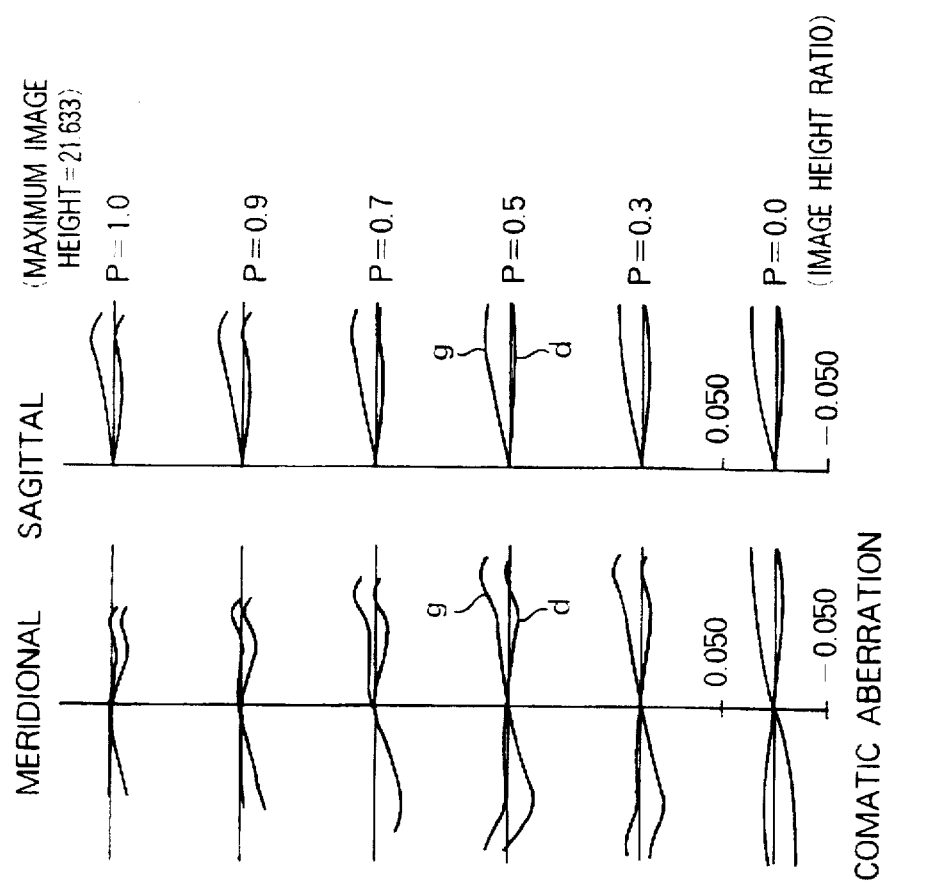
FIGS. 16a to 16e are aberrational diagrams with respect to a telescopic end of the zoom lens in the embodiment 3.
Figures 23A, 23B, 23C, 23D, 23E:
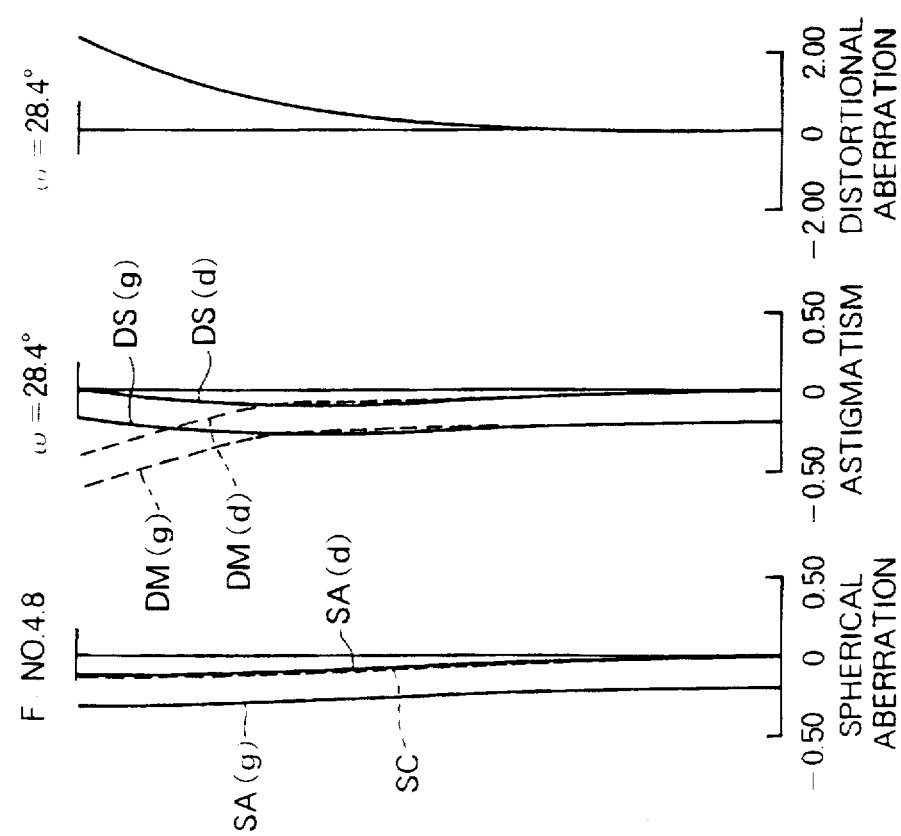
FIGS. 23a to 23e are aberrational diagrams with respect to the wide angle end of the zoom lens in the embodiment 6.

FIGS. 7a–7c show a lens arrangement at the wide angle end, an intermediate focal length and a telescopic end of a zoom lens with respect to the embodiment 7. FIGS. 26a to 26e show aberrational diagrams at the wide angle end with respect to the embodiment 7. FIGS. 27a to 27e show aberrational diagrams at the intermediate focal length with respect to the embodiment 7. FIGS. 28a to 28e show aberrational diagrams at the telescopic end with respect to the embodiment 7.

In each of the embodiments, aberrations are preferably corrected.

As explained above, a novel zoom lens of high magnification can be provided in accordance with the present invention. Since the zoom lens of the present invention is constructed as above, the zoom lens is constructed by three zoom groups and comprises six lens groups composed of six lenses. Accordingly, the number of constructional lenses is reduced so that the zoom lens is compact and cost of the zoom lens can be reduced.

In the above construction, performance of the zoom lens in each of the first to seventh constructions is extremely preferable while a zoom ratio close to 3 to 3.5 magnifications is realized.

When a focusing operation is performed by moving the second zoom group as in the fourth construction of the present invention, a focusing mechanism can be compactly constructed without increasing a lens diameter.

When a diaphragm is arranged before the second zoom group as in the fifth construction of the present invention, a front lens diameter can be reduced so that an arranging mechanism of the diaphragm and the second zoom group is simply constructed and strongly bears eccentricity. Accordingly, it is possible to realize a zoom lens which can be easily assembled and has excellent mass productivity.

When the diaphragm is fixedly arranged at a focusing time as in the sixth construction of the present invention, a focusing ring can be omitted as mentioned above and a camera mounting the zoom lens thereon can be made further compact.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom lens of high magnification having first, second and third zoom groups which are sequentially arranged from an object side to an image side and respectively have a positive focal length, a positive focal length and a negative focal length;

the zoom lens consisting of six lenses and being constructed such that the entire first to third zoom groups are moved onto the object side by zooming from a wide angle end to a telescopic end while a distance between the second and third zoom groups is reduced;

the first zoom group consisting of one positive lens and one negative lens;

the second zoom group consisting of a meniscus negative lens and a biconvex positive lens sequentially arranged from the object side toward the image side, the meniscus negative lens having a concave face directed to the object side and the biconvex positive lens having a lens face constructed by an aspherical surface;

a third zoom group consisting of one positive lens and one negative lens;

a focal length $f_1$ of the first zoom group, a combined focal length $f_T$ of the entire lens system at the telescopic end, a focal length $f_2$ of the second zoom group and a combined focal length $f_W$ of the entire lens system at the wide angle end satisfying the following conditions;

$$0.9 < f_1/f_T < 1.5 \quad (1)$$

$$0.6 < f_2/f_W < 0.85 \quad (2)$$

and at least one lens face of the third zoom group being constructed by an aspherical surface.

2. A zoom lens of high magnification as claimed in claim 1, wherein a curvature radius $r_{21}$ of a concave face of the meniscus negative lens of the second zoom group on the object side and a curvature radius $r_{22}$ of a convex face of the meniscus negative lens of the second zoom group on the image side satisfy the following condition $$2.5 < |(r_{21}+r_{22})/(r_{21}-r_{22})| < 7 \quad (3).$$

3. A zoom lens of high magnification as claimed in claim 1, wherein a lens of the third zoom group on the object side is a positive lens and at least one face of this positive lens is an aspherical surface.

4. A zoom lens of high magnification as claimed in claim 1, wherein a focusing operation is performed by moving the second zoom group onto the object side.

5. A zoom lens of high magnification as claimed in claim 4, wherein a diaphragm is arranged before the second zoom group and is moved integrally with the second zoom group at zooming and focusing times.

6. A zoom lens of high magnification as claimed in claim 4, wherein a diaphragm is arranged before the second zoom group and is moved integrally with the second zoom group at a zooming time and is fixed at a focusing time, and a distance between the second zoom group and the diaphragm is reduced by moving the second zoom group onto a diaphragm side.

7. A zoom lens of high magnification as claimed in claim 1, wherein at least one lens of the second zoom group and one lens of the third zoom group are constructed by adhering a thin resin layer onto a spherical surface and forming an aspherical surface on a surface of the resin layer.

* * * * *